(12) United States Patent
Oda et al.

(10) Patent No.: US 10,044,523 B2
(45) Date of Patent: Aug. 7, 2018

(54) COMMUNICATION APPARATUS, SERVER, COMMUNICATION SYSTEM, AND COMMUNICATION METHOD

(71) Applicant: FUJITSU LIMITED, Kawasaki-shi, Kanagawa (JP)

(72) Inventors: Masaya Oda, Fukuoka (JP); Ryuichi Ebuchi, Fukuoka (JP); Tomokazu Makino, Fukuoka (JP); Junji Ono, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 15/280,844

(22) Filed: Sep. 29, 2016

(65) Prior Publication Data
US 2017/0019270 A1 Jan. 19, 2017

Related U.S. Application Data

(63) Continuation of application No. PCT/JP2014/061477, filed on Apr. 23, 2014.

(51) Int. Cl.
*H04L 12/46* (2006.01)
*H04L 29/12* (2006.01)

(52) U.S. Cl.
CPC ........ *H04L 12/4604* (2013.01); *H04L 61/255* (2013.01); *H04L 61/256* (2013.01); *H04L 61/2514* (2013.01); *H04L 61/2557* (2013.01)

(58) Field of Classification Search
CPC ............ H04L 12/4604; H04L 61/256
See application file for complete search history.

(56) References Cited

U.S. PATENT DOCUMENTS

| | | | | |
|---|---|---|---|---|
| 7,694,343 | B2* | 4/2010 | Sobel | H04L 63/105 726/22 |
| 9,369,302 | B1* | 6/2016 | Dickinson | H04L 41/0896 |
| 2006/0080380 | A1 | 4/2006 | Aizu et al. | |
| 2008/0019367 | A1* | 1/2008 | Ito | H04L 29/12009 370/392 |
| 2008/0075097 | A1 | 3/2008 | Kitada | |

(Continued)

FOREIGN PATENT DOCUMENTS

| | | |
|---|---|---|
| JP | 2005-102316 | 4/2005 |
| JP | 2005-130453 | 5/2005 |

(Continued)

OTHER PUBLICATIONS

Office Action dated Jul. 18, 2017 issued with respect to the corresponding Japanese Patent Application No. 2016-514623 Full machine translated office action.

(Continued)

*Primary Examiner* — Rasheed Gidado
(74) *Attorney, Agent, or Firm* — Maschoff Brennan

(57) ABSTRACT

According to one aspect, a communication apparatus is provided which is on a LAN and coupled to a server via an external network involving a NAT traversal with a router of the LAN. The communication apparatus is configured to determine a configuration of the router of the LAN; and request the server to transmit a NAT update request packet to the router, which is registered in the server and performs the NAT traversal, when it is determined that the configuration of the router of the LAN is in two or more stages.

9 Claims, 47 Drawing Sheets

(56) References Cited

U.S. PATENT DOCUMENTS

2008/0232362 A1    9/2008  Miyajima et al.
2013/0124735 A1*   5/2013  Shin .................. H04L 61/2007
                                                            709/226

FOREIGN PATENT DOCUMENTS

| JP | 2007-043374 | 2/2007 |
| JP | 2008-085470 | 4/2008 |
| JP | 2008-236297 | 10/2008 |

OTHER PUBLICATIONS

International Search Report of Int. Appl. No. PCT/JP2014/061477 dated Jul. 8, 2014.
Written Opinion of the International Searching Authority of Int. Appl. No. PCT/JP2014/061477 dated Jul. 8, 2014 translation of the relevant part.

* cited by examiner

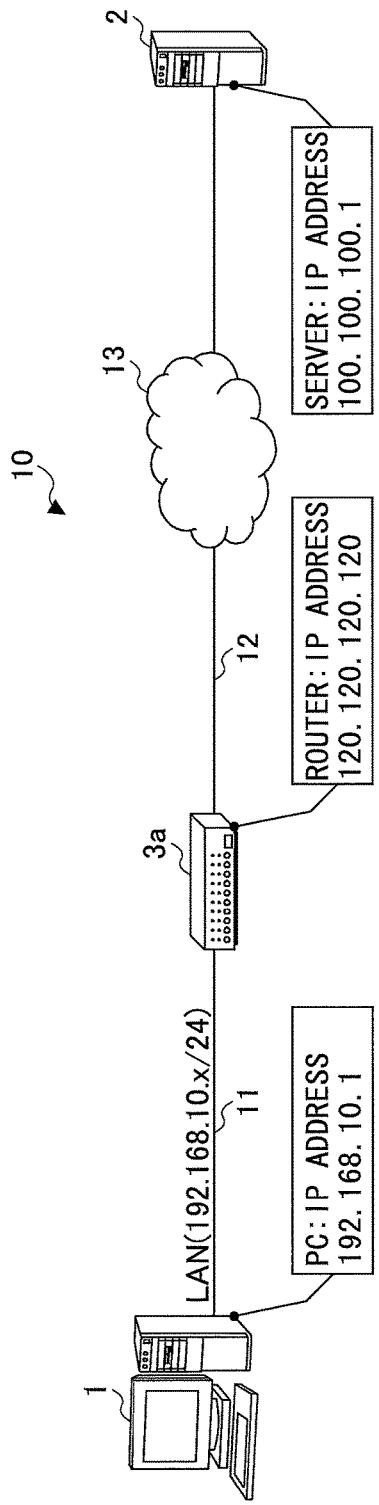
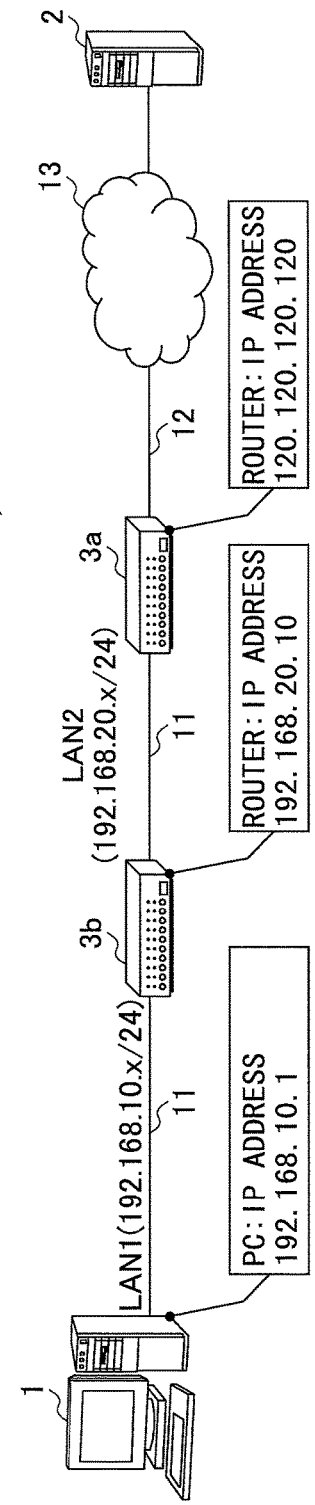

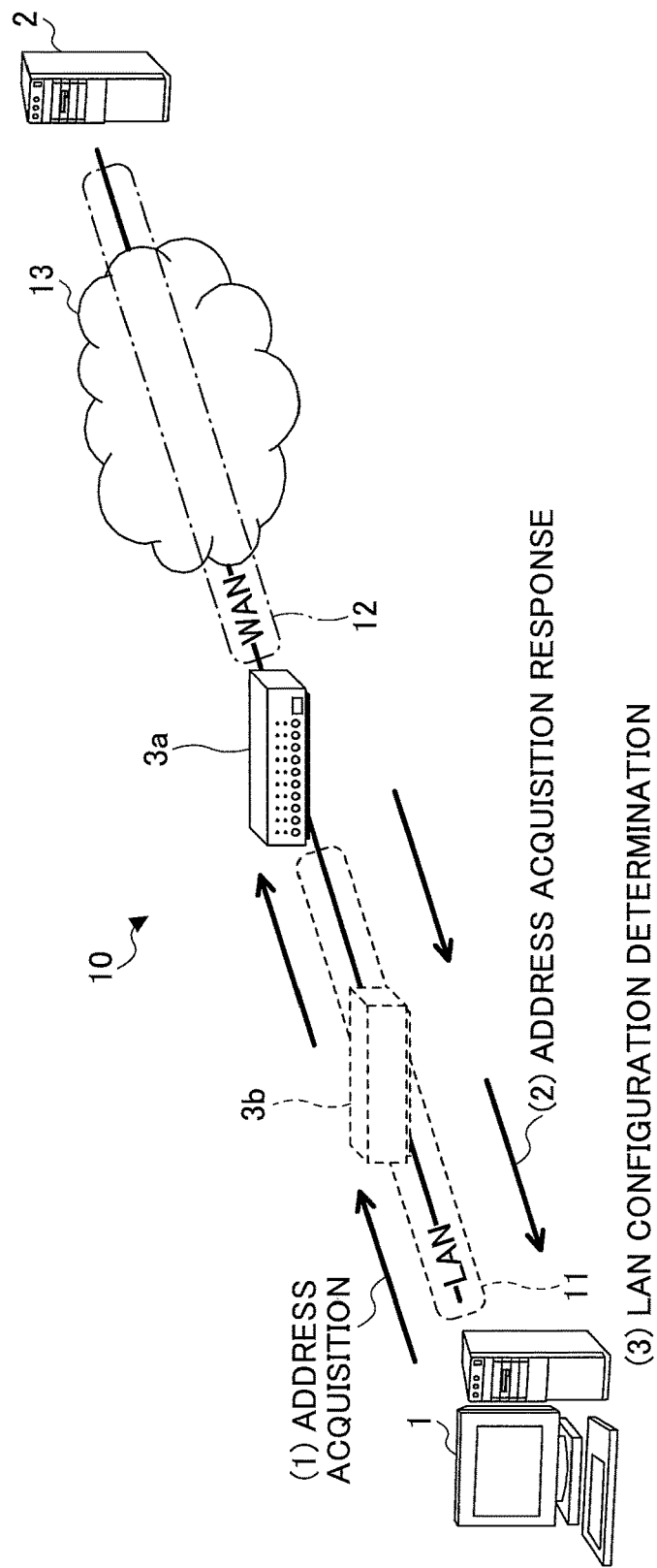

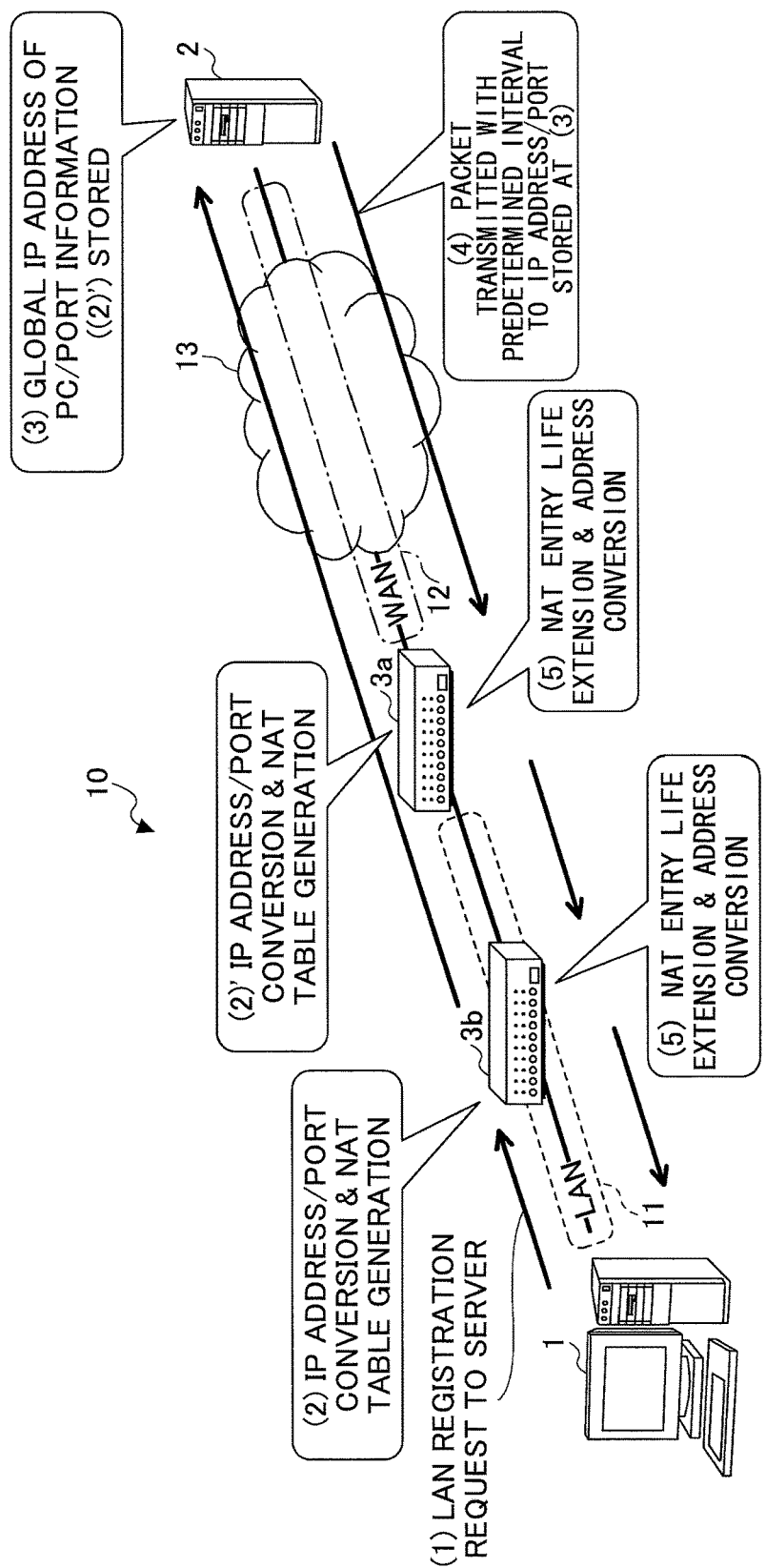

| MESSAGE TYPE (61) | PERIODICAL TRANSMISSION INTERVAL (SEC) (62) |
|---|---|
| LAN REGISTRATION REQUEST | 800 |

START → TERMINAL ID DETERMINED (S100) → LAN REGISTRATION REQUEST TRANSMITTED TO COMMUNICATION CONTROL PART (S101)

| MESSAGE TYPE (61) | PERIODICAL TRANSMISSION INTERVAL (SEC) (62) | TERMINAL ID (63) |
|---|---|---|
| LAN REGISTRATION REQUEST | 800 | 12345 |

FIG.9

| IP HEADER | UDP HEADER | | LAN INFORMATION | | |
|---|---|---|---|---|---|
| 71 | 72 | 73 | 74 | 75 | 76 | 77 |
| DESTINATION IP | SENDER IP | DESTINATION PORT | SENDER PORT | MESSAGE TYPE | TERMINAL ID | PERIODICAL TRANSMISSION INTERVAL (SEC) |
| 100.100.100.1 | 192.168.10.1 | 2000 | 1000 | LAN REGISTRATION | 12345 | 800 |

FIG.10

| PRIVATE IP ADDRESS | PRIVATE PORT | GLOBAL IP ADDRESS | GLOBAL PORT | SERVER IP ADDRESS | SERVER PORT |
|---|---|---|---|---|---|
| 81 | 82 | 83 | 84 | 85 | 86 |
| 192.168.10.1 | 1000 | 120.120.120.120 | 1500 | 100.100.100.1 | 2000 |
| ... | ... | ... | ... | ... | ... |

FIG.11

| IP HEADER | UDP HEADER | | MESSAGE CONTENT | | |
|---|---|---|---|---|---|
| DESTINATION IP (91) | SENDER IP (92) | DESTINATION PORT (93) | SENDER PORT (94) | MESSAGE TYPE (95) | TERMINAL ID (96) | PERIODICAL TRANSMISSION INTERVAL (SEC) (97) |
| 100.100.100.1 | 120.120.120.120 | 2000 | 1500 | LAN REGISTRATION | 12345 | 800 |

FIG.13

| TERMINAL ID _241 | TERMINAL IP ADDRESS _242 | TERMINAL PORT NUMBER _243 | PERIODICAL TRANSMISSION INTERVAL (SEC) _244 |
|---|---|---|---|
| 12345 | 120.120.120.120 | 1500 | 800 |
| ... | ... | ... | ... |

| IP HEADER | | UDP HEADER | | MESSAGE CONTENT | |
|---|---|---|---|---|---|
| DESTINATION IP | SENDER IP | DESTINATION PORT | SENDER PORT | MESSAGE TYPE | TERMINAL ID |
| 192.168.10.1 | 100.100.100.1 | 1000 | 2000 | NAT UPDATE | 12345 |

| MESSAGE TYPE 123 | RESULT 124 |
|---|---|
| LAN CONFIGURATION DETERMINATION RESPONSE | SINGLE-STAGE/MULTIPLE-STAGE/UNDETERMINABLE |

FIG.28

| MESSAGE TYPE /126 | PERIODICAL TRANSMISSION INTERVAL (SEC) /127 | OPTIMIZATION /128 |
|---|---|---|
| LAN REGISTRATION REQUEST | 800 | YES |

FIG.29

| IP HEADER ~131 | UDP HEADER | | LAN INFORMATION | | | | |
|---|---|---|---|---|---|---|---|
| | ~132 | ~133 | ~134 | ~135 | ~136 | ~137 | ~138 |
| DESTINATION IP | SENDER IP | DESTINATION PORT | SENDER PORT | MESSAGE TYPE | TERMINAL ID | PERIODICAL TRANSMISSION INTERVAL (SEC) | OPTIMIZATION |
| 100.100.100.1 | 192.168.10.1 | 2000 | 1000 | LAN REGISTRATION | 12345 | 800 | YES |

FIG.31

| | 141 | 142 | 143 | 144 | 145 | 146 | 147 | 148 |
|---|---|---|---|---|---|---|---|---|
| | DESTINATION IP | SENDER IP | DESTINATION PORT | SENDER PORT | MESSAGE TYPE | TERMINAL ID | TERMINAL IP ADDRESS | TERMINAL PORT NUMBER |
| | 100.100.100.2 | 100.100.100.1 | xxxx | yyyy | CYCLE OPTIMIZATION REQUEST | 12345 | 120.120.120.120 | 1200 |

IP HEADER: 141, 142
UDP HEADER: 143, 144

FIG.33

| TERMINAL ID /151 | TERMINAL IP ADDRESS /152 | TERMINAL PORT NUMBER /153 | CURRENT CYCLE (SEC) /154 | LATEST CYCLE (SEC) /155 |
|---|---|---|---|---|
| 12345 | 120.120.120.120 | 1200 | 800 | 0 |

FIG.35

| IP HEADER | | UDP HEADER | | MESSAGE CONTENT | |
|---|---|---|---|---|---|
| DESTINATION IP ⌒161 | SENDER IP ⌒162 | DESTINATION PORT ⌒163 | SENDER PORT ⌒164 | MESSAGE TYPE ⌒165 | TERMINAL ID ⌒166 |
| 120.120.120.120 | 100.100.100.2 | 1200 | 2000 | SURVIVAL CONFIRMATION | 12345 |

FIG.37

| IP HEADER | | UDP HEADER | | MESSAGE CONTENT | |
|---|---|---|---|---|---|
| DESTINATION IP 171 | SENDER IP 172 | DESTINATION PORT 173 | SENDER PORT 174 | MESSAGE TYPE 175 | TERMINAL ID 176 |
| 100.100.100.2 | 192.168.10.1 | 2000 | 1000 | SURVIVAL CONFIRMATION RESPONSE | 12345 |

FIG.39

| TERMINAL ID ～181 | TERMINAL IP ADDRESS ～182 | TERMINAL PORT NUMBER ～183 | CURRENT INTERVAL (SEC) ～184 | LATEST INTERVAL (SEC) ～185 |
|---|---|---|---|---|
| 12345 | 120.120.120.120 | 1200 | 1600 | 800 |

FIG.41

| IP HEADER | | UDP HEADER | | | | |
|---|---|---|---|---|---|---|
| DESTINATION IP ⌇191 | SENDER IP ⌇192 | DESTINATION PORT ⌇193 | SENDER PORT ⌇194 | MESSAGE TYPE ⌇195 | TERMINAL ID ⌇196 | CYCLE TIMER (SEC) ⌇197 |
| 100.100.100.1 | 100.100.100.2 | yyyy | xxxx | CYCLE OPTIMIZATION RESPONSE | 12345 | 800 |

FIG.46

| MESSAGE TYPE 201 | TERMINAL ID 202 | TERMINAL IP ADDRESS 203 | TERMINAL PORT NUMBER 204 |
|---|---|---|---|
| OVERLAP LAN SEARCH REQUEST | 12345 | 130.130.130.130 | 1300 |

FIG.48

| TERMINAL ID ⌒211 | TERMINAL IP ADDRESS ⌒212 | TERMINAL PORT NUMBER ⌒213 |
|---|---|---|
| 12345 | 130.130.130.130 | 1300 |
| ... | ... | ... |

FIG.49

| MESSAGE TYPE ⌒221 | RESULT ⌒222 | TERMINAL ID ⌒223 | TERMINAL IP ADDRESS ⌒224 | TERMINAL PORT NUMBER ⌒225 |
|---|---|---|---|---|
| OVERLAP LAN SEARCH REQUEST | NO OVERLAP/ OVERLAP DETECTED | 12345 | 130.130.130.130 | 1300 |

| TERMINAL ID | TERMINAL IP ADDRESS | TERMINAL PORT NUMBER | PERIODICAL TRANSMISSION INTERVAL (SEC) |
|---|---|---|---|
| 231 | 232 | 233 | 234 |
| 12345 | 130.130.130.130 | 1300 | 800 |
| ... | ... | ... | ... |

FIG.52

| TERMINAL ID | TERMINAL IP ADDRESS | TERMINAL PORT NUMBER |
|---|---|---|
| 12345 | 140.140.140.140 | 1400 |
| ... | ... | ... |

FIG.53

| TERMINAL ID | TERMINAL IP ADDRESS | TERMINAL PORT NUMBER | PERIODICAL TRANSMISSION INTERVAL (SEC) |
|---|---|---|---|
| 12345 | 140.140.140.140 | 1400 | 800 |
| ... | ... | ... | ... |

COMMUNICATION APPARATUS, SERVER, COMMUNICATION SYSTEM, AND COMMUNICATION METHOD

CROSS-REFERENCE TO RELATED APPLICATIONS

This is a continuation of International Application No. PCT/JP2014/061477, filed on Apr. 23, 2014, the entire contents of which are incorporated herein by reference.

FIELD

The present disclosure is related to a communication apparatus, a server, a communication system, and a communication method.

BACKGROUND

Japanese Laid-open Patent Publication No. 2005-102316 and Japanese Laid-open Patent Publication No. 2005-130453 disclose a configuration in which apparatuses on LAN (Local Area Network) at home are coupled to apparatuses on Internet via a router.

Addressing systems allocated to the networks differ between the apparatus on the LAN and the apparatuses on the Internet. The router performs an address conversion by using a NAT entry associating a private IP address of the LAN and a global IP address of the Internet, which enables communications (i.e., NAT traversal) between the apparatuses on the LAN and the apparatuses on the Internet.

Techniques related to the NAT traversal includes, for example, a port forwarding with a static NAT/UPnP (Universal Plug and Play) and a dynamic NAT/STUN (Simple Traversal of UDP through NATs). The port forwarding with the static NAT/UPnP sets a fixed NAT entry with respect to a NAT router, or sets a fixed port forward with UPnP with respect to an UPnP-capable router. The dynamic NAT dynamically generates the NAT entry at the communication via the Internet. In this case, the NAT entry is deleted upon no communication being performed for a certain time.

However, after the NAT entry has been deleted, the IP addresses cannot be associated in the router, which disables the communication between the apparatuses on the LAN and the apparatuses on the Internet.

On the other hand, the NAT entry set by the UPnP-capable router is not deleted. However, the UPnP technique cannot be used in the apparatus and its neighboring router on the LAN.

SUMMARY

According to one aspect, a communication apparatus is provided which is on a LAN and coupled to a server via an external network involving a NAT traversal with a router of the LAN. The communication apparatus is configured to determine a configuration of the router of the LAN; and request the server to transmit a NAT update request packet to the router, which is registered in the server and performs the NAT traversal, when it is determined that the configuration of the router of the LAN is in two or more stages.

The object and advantages of the embodiment will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 1A and 1B are diagrams illustrating a communication system according to a first embodiment.

FIG. 2 is a diagram illustrating a NAT traversal in a case where a router of the communication system is in a single stage.

FIG. 3 is a diagram illustrating a NAT traversal in a case where a router of the communication system is in multiple stages.

FIG. 9 is a diagram illustrating an example of a LAN registration request transmitted from the PC in S4 in FIG. 5.

FIG. 10 is a diagram illustrating an example of the NAT entry stored in S5 in FIG. 5.

FIG. 11 is a diagram illustrating an example of a LAN registration request after a NAT conversion in S6 in FIG. 5.

FIG. 13 is a diagram illustrating an example of a LAN information table in S8 in FIG. 5.

FIG. 16 is a diagram illustrating an example of a NAT update request after a NAT conversion in S13 in FIG. 5.

FIG. 23 is a diagram illustrating an example of a LAN configuration determination response in S31 in FIG. 18.

FIG. 28 is a diagram illustrating an example of a LAN registration request in S41 in FIG. 27.

FIG. 29 is a diagram illustrating an example of a LAN registration request transmitted from the PC in S44 in FIG. 27.

FIG. 31 is a diagram illustrating an example of a cycle optimization request in S50 in FIG. 27.

FIG. 33 is a diagram illustrating an example of a cycle transmission management table (at the time of an initial registration) in S52 in FIG. 27.

FIG. 35 is a diagram illustrating an example of a NAT entry survival confirmation in S55 in FIG. 27.

FIG. 37 is a diagram illustrating an example of a NAT entry survival confirmation response in S61 in FIG. 27.

FIG. 39 is a diagram illustrating an example of a cycle transmission management table in S71 in FIG. 27.

FIG. 41 is a diagram illustrating an example of a cycle optimization response in S79 in FIG. 27.

FIG. 46 is a diagram illustrating an example of an overlapped LAN search request in S90 in FIG. 45.

FIG. 48 is a diagram illustrating an example of an overlap management table in S91 in FIG. 45.

FIG. 49 is a diagram illustrating an example of an overlapped LAN search response in S92 in FIG. 45.

FIG. 52 is a diagram illustrating an example of an overlap management table in S102 in FIG. 45.

FIG. 53 is a diagram illustrating an example of a LAN information table in S104 in FIG. 45.

DESCRIPTION OF EMBODIMENTS

Figure 4:
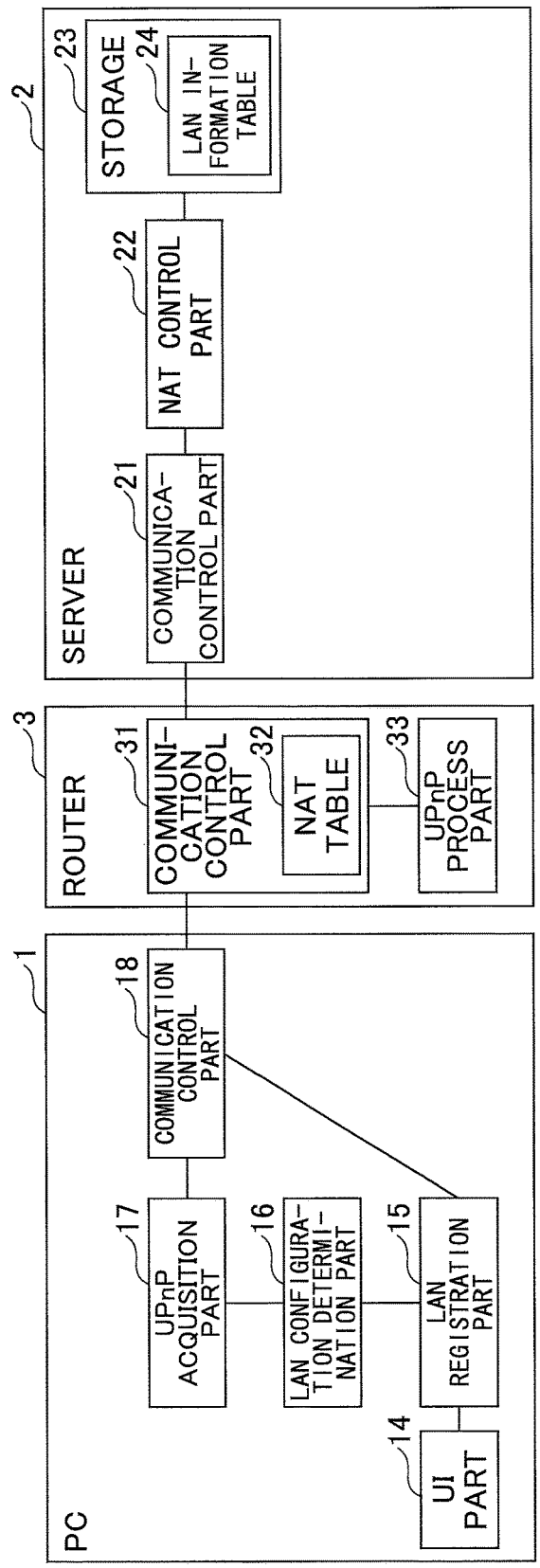
FIG. 4 is a diagram illustrating a function configuration of a PC, a server, and a router according to the first embodiment.

In the following, embodiments will be described by referring to the accompanying drawings. It is noted that elements that have substantially the same functional configuration are given the same reference number in the specification and the drawings, and redundant explanation thereof is omitted.

First Embodiment

At first, a communication system according to a first embodiment of a present invention is described with reference to FIGS. 1A and 1B. FIGS. 1A and 1B are diagrams illustrating the communication system according to the first embodiment. FIG. 1A illustrates a case where a router configuration of a LAN of the communication system 10 is in a single stage, and FIG. 1B illustrates another case where a router configuration of a LAN of the communication system 10 is in multiple stages (two or more stages).

According to the communication system 10 illustrated in FIG. 1A, a PC 1 and a server 2 are coupled to each other via a LAN 11, a WAN 12, and Internet 13. A router 3a generates a NAT entry in which a private IP address of the PC 1 and a global IP address of the WAN 12 are associated with each other, and performs an address conversion between the private IP address and the global IP address based on the NAT entry. In the following, the private IP address is also referred to as "a local IP address". With this arrangement, the communication between the PC 1 and the server 2 is enabled. It is noted that the WAN 12 and the Internet 13 are examples of an external network.

The communication system 10 illustrated in FIG. 1B illustrates a case where a router configuration of the LAN 11 is in two stages such that routers 3a and 3b (also collectively referred to as "a router 3", hereinafter) are provided. The router 3b generates the NAT entry associating the private IP address in the LAN to perform the address conversion. The router 3a generates the NAT entry associating the private IP address in the LAN 11 with the global IP address of the WAN 12 to perform the address conversion.

As illustrated in FIG. 2, the PC 1 transmits an acquisition request of the IP address to the neighboring router 3 (i.e., the router 3b in the case of a single stage, and the router 3a in the case of the two stages) (see (1) in FIG. 2). The PC 1 obtains the IP address from the neighboring router 3 (see (2) in FIG. 2).

The PC 1 performs a determination, based on the obtained IP address, whether the router configuration in the LAN 11 is in a single stage or multiple stages. The PC 1, when determining that the IP address is the private IP address, determines that the router configuration of the router 3 is in the multiple stages, and determines that the conversion from the private IP address to the global IP address is performed at another router ahead of the neighboring router.

On the other hand, the PC 1, when determining that the IP address is the global IP address, determines that the router configuration of the router 3 is in a single stage because it can be determined that the conversion from the private IP address to the global IP address is performed at the neighboring router.

The router configuration of the router 3 in the LAN 11 is in a single stage, the NAT traversal can be implemented with the port forwarding by the UPnP. In this case, the NAT entry is not deleted even if no communication is performed for a predetermined time.

If the router configuration of the router 3 in the LAN 11 is in multiple stages, the router 3 on the side of the WAN 12 (i.e., adjacent to the Internet 13) dynamically generates the NAT entry when the communication with the Internet 13 is performed. In this case, the NAT entry is deleted upon no communication being performed for a predetermined time.

According to the communication system 10 of the embodiment described hereinafter, it is determined the router configuration of the router 3 is in multiple stages, and when it is determined that the router configuration of the router 3 is in multiple stages, the PC 1 outputs a registration request for the LAN 11 (i.e., the registration request for extending the life of the NAT entry even upon no communication for the predetermined time), and the server 2 transmits a NAT update request packet to the registered LAN 11. With this arrangement, it becomes possible to prevent the NAT entry from being deleted even upon no communication for the predetermined time.

Specifically, as illustrated in FIG. 3, the PC 1 transmits the LAN registration request to the server 2 when the PC 1 determines that the router configuration of the router 3 in the LAN 11 is in multiple stages (see (1) in FIG. 3). The router 3b performs an IP address and port conversion to generate the NAT entry (see (2) in FIG. 3). The router 3a performs an IP address and port conversion to generate the NAT entry (see (2)' in FIG. 3). With this arrangement, the NAT traversal is enabled.

The server 2, in response to the LAN registration request from the PC 1, stores the global IP address and the port information of the PC 1 related to (2)' in a LAN information table described hereinafter (see (3) in FIG. 3). Next, the server 2 transmits the NAT update request packet to the global IP address and the port information stored in the LAN information table related to (3) at a predetermined interval (regularly, for example) (see (4) in FIG. 3). When the router 3a receives the NAT update request packet, the deletion of the NAT entry due to no communication for the predetermined time is prevented, which enables keeping a state in which the NAT traversal is enabled (see (5) in FIG. 3). Further, the PC 1 transmits the registration request of the LAN 11 only when the router configuration of the router 3 in the LAN 11 is in multiple stages, and the server 2 transmits the NAT update request packet in response to the registration request. With this arrangement, if the router configuration of the router 3 is in single stage, the NAT update request packet is not transmitted periodically, which enables decreasing the load of the server 2 and the network.

It is noted that the router 3b performs the private IP address conversion to transmit the NAT update request packet to the PC 1. The router 3b, like the router 3a, can extend the life of the NAT entry when the router 3 receives the NAT update request packet (see (5) in FIG. 3).

As described above, according to the embodiment, if the router configuration of the router 3 in the LAN 11 is in multiple stages, the server 2 transmits the NAT update request packet with UDP (User Datagram Protocol) to the PC 1 related to the global IP address and the port information with the predetermined interval, which enables keeping the NAT entry of the router 3.

Next, function configurations of the PC 1, the server 2, and the router 3 according to the first embodiment are described. FIG. 4 is a diagram illustrating a function configuration of the PC 1, the server 2, and the router 3 according to the first embodiment.

The PC 1 includes an UI part 14, a LAN registration part 15, a LAN configuration determination part 16, an UPnP acquisition part 17, and a communication control part 18. The PC 1 is an example of an communication apparatus on the LAN that performs the NAT traversal with the router 3 of the LAN 11 to be coupled to the server 2 via an external network such as Internet 13, etc. The communication apparatus is not limited to the PC 1. The communication apparatus may be a television receiver, a recording/reproducing apparatus, a game apparatus, a multimedia apparatus such as a music reproducing apparatus, home appliances with a communication function, such as a refrigerator, a washing machine, an air conditioner, a microwave oven, etc., a portable apparatus, a tablet type terminal, etc.

The UI part 14 includes an interface function for performing the LAN registration to the server 2. The LAN registration part 15 controls the LAN registration to the server 2. The UPnP acquisition part 17 accesses to the UPnP-capable router 3 to obtain the IP address. The LAN configuration determination part 16 determines, based on the obtained IP address, whether the router configuration in the LAN 11 is in single stage or multiple stages. The communication control part 18 controls the communication with other apparatuses with TCP/IP (TCP: Transmission Control Protocol, IP: Internet Protocol).

The router 3 includes a communication control part 31 and an UPnP process part 33. The communication control part 31 controls the communication with other apparatuses with TCP/IP. The UPnP process part 33 transmits the outward IP address of the PC 1 in response to the IP address acquisition by the UPnP acquisition part 17 of the PC 1. The communication control part 31 holds a NAT table 32. The NAT table 32 is a table used for the address conversion and has the NAT entry stored therein for performing the IP address conversion between the LAN and the WAN 12 (i.e., the Internet 13).

The server 2 includes a communication control part 21, a NAT control part 22, and a storage 23. The communication control part 21 controls the communication with other apparatuses with TCP/IP. The NAT control part 22 transmits the NAT update request packet to the router 3 in response to the LAN registration request from the PC 1. The storage 23 stores, in a LAN information table 24, information of the NAT entry of the router 3 to which the NAT update request packet is to be transmitted in response to the LAN registration request.

Figure 5:
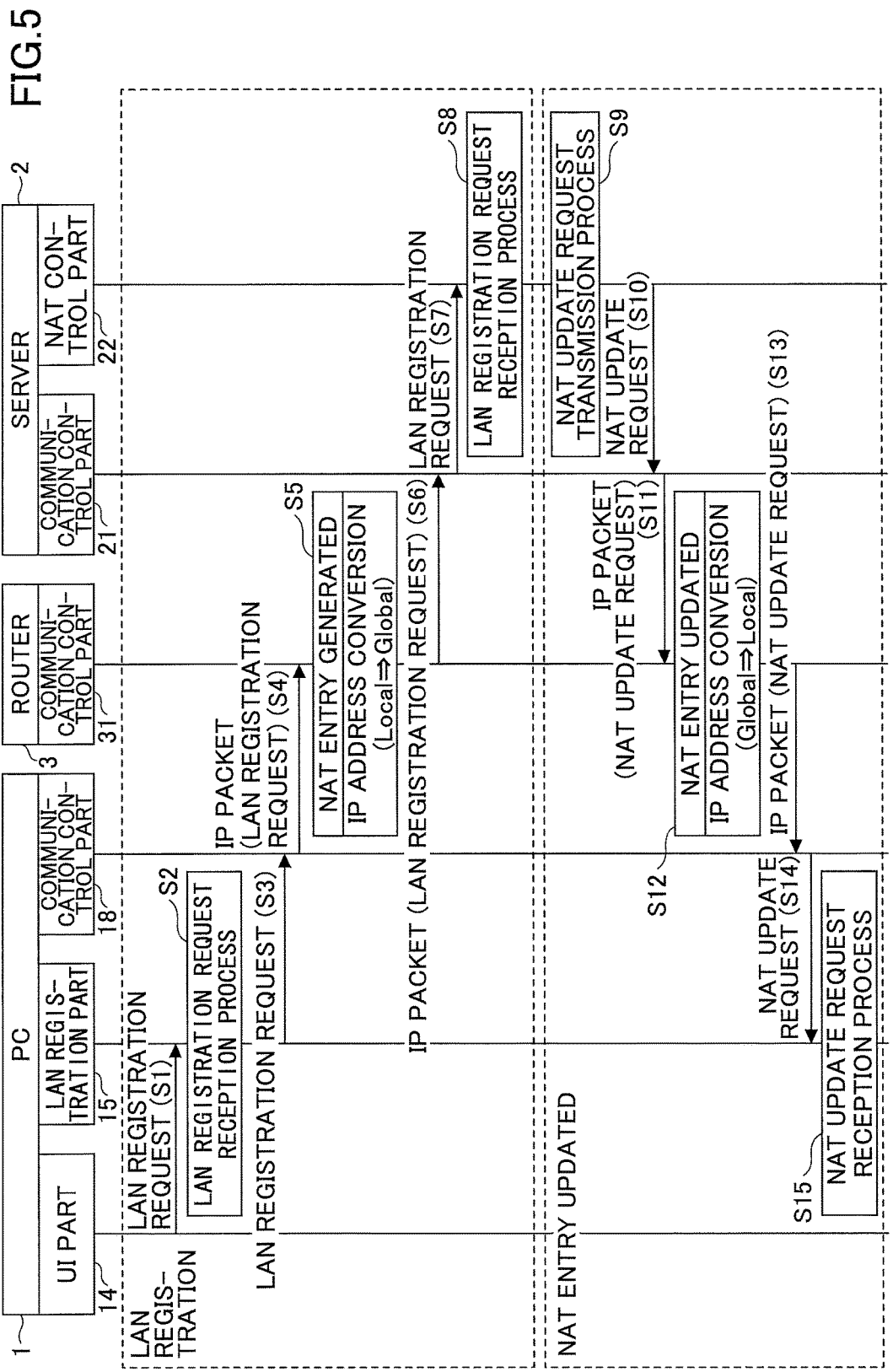
FIG. 5 is a flowchart of a NAT entry update process (in a single-stage router configuration).

Next, a NAT entry update process in the case where the router configuration is in a single stage is explained with reference to FIG. 5. FIG. 5 is a flowchart of a NAT entry update process (in a single-stage router configuration). In FIG. 5, the LAN registration process is performed, and then the NAT entry update process is performed.

Figures 6, 7, 8:
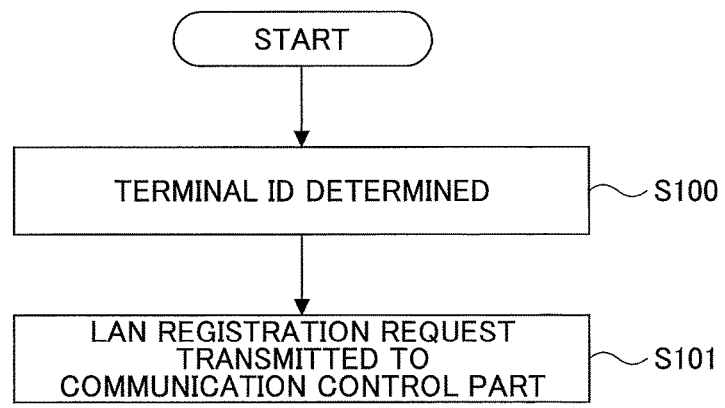
FIG. 6 is a diagram illustrating an example of a LAN registration request in S1 in FIG. 5.
FIG. 7 is a flowchart of a LAN registration request reception process in S2 in FIG. 5.
FIG. 8 is a diagram illustrating an example of a LAN registration request in S3 in FIG. 5.

When the NAT entry update process is started, at first, the UI part 14 of the PC 1 transmits the LAN registration request (step S1). FIG. 6 is a diagram illustrating an example of information included in the LAN registration request in which a parameter on an upper side and a setting value for the parameter on a lower side are illustrated. In the LAN registration request, "LAN registration request" is set in a message type 61, and "800 sec" is set in periodical transmission interval information 62.

In FIG. 5 the LAN registration part 15 performs a LAN registration request reception process in response to the LAN registration request of step S1 (step S2). According to the LAN registration request reception process in FIG. 7, the LAN registration part 15 determines a terminal ID (step S100), and transmits the LAN registration request to the communication control part 18 (step S101). The terminal ID may be a MAC address of the PC 1, or other IDs that can be uniquely identified on the Internet.

In FIG. 5, then, the LAN registration part 15 transmits the LAN registration request (step S3). As illustrated in FIG. 8, information included in the LAN registration request transmitted from the LAN registration part 15 has the terminal ID 63 "12345" added to the LAN registration request transmitted from the UI part 14 in step S1.

In FIG. 5, then, the LAN registration part 18 transmits an IP packet of the LAN registration request (step S4). The IP packet of the LAN registration request illustrated in FIG. 9 is transmitted from the PC 1 to the router 3. In the IP packet of the LAN registration request, an IP header includes a destination IP address 71 and a sender IP address 72 set therein, a UDP header includes a destination port 73 and a sender port 74 set therein, and LAN information includes a message type 75, a terminal ID 76, and periodical transmission interval information 77 set therein. In this case, the IP address "100.100.100.1" of the server 2 is set in the destination IP address 71, the IP address "192.168.10.1" of the PC 1 is set in the sender IP address 72, the port "2000" of the server 2 is set in the destination port 73, and the port "1000" of the PC 1 is set in the sender port 74.

In FIG. 5, then, the communication control part 31 of the router 3 generates the NAT entry associating the private IP address with the global IP address to perform the address conversion (step S5). As illustrated in FIG. 10, the NAT entry generated by the router 3 includes information of a private IP address 81, a private port 82, a global IP address 83, a global port 84, a server IP address 85, and a server port 86. The NAT entry thus generated is stored in the NAT table 32. The router 3 performs, based on the NAT entry, the address conversion from the private IP address "192.168.10.1" to the global IP address "120.120.120.120" of the Internet. In this way, the PC 1 performs the NAT traversal, and becomes capable of coupling to the server 2 via the Internet 13.

In FIG. 5, then, the communication control part 31 of the router 3 transmits the IP packet of the LAN registration request after the NAT conversion to the server 2 (step S6). According to the LAN registration request after the NAT conversion illustrated in FIG. 11, the global IP address after the address conversion "120.120.120.120" is set in a sender IP address 92, and the global port "1500" is set in a sender port 94.

Figure 12:
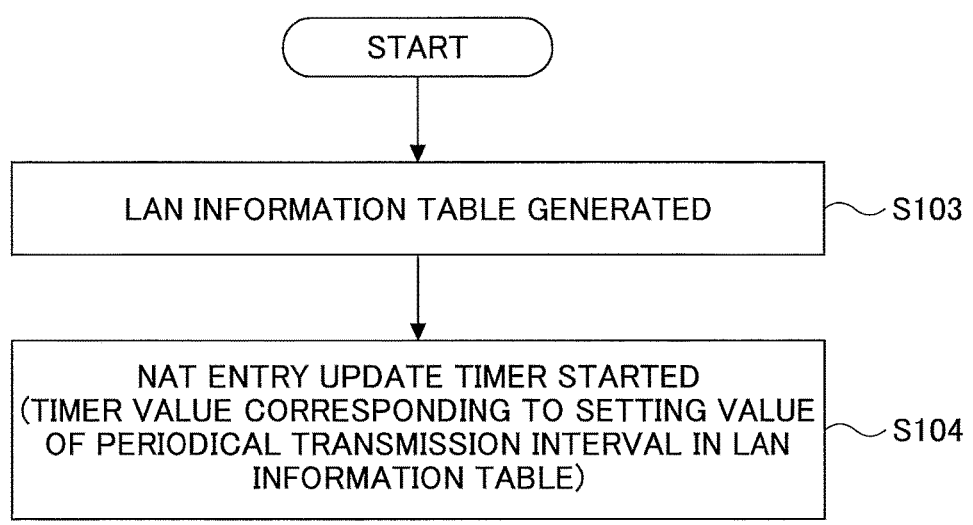
FIG. 12 is a flowchart of a LAN registration request reception process in S8 in FIG. 5.

In FIG. 5, then, the communication control part 21 of the server 2 receives the IP packet of the LAN registration request after the NAT conversion, and transmits the LAN registration request to the NAT control part 22 (step S7). The NAT control part 22 performs the LAN registration request reception process (step S8). As illustrated in FIG. 12, in the LAN registration request reception process, the NAT control part 22 generates the LAN information table 24 (step S103). The storage 23 stores the LAN information table 24. The LAN information table 24 includes information of a terminal ID 241, a terminal IP address 242, a terminal port number 243, and periodical transmission interval information 244, as illustrated in FIG. 13. An ID for identifying the PC 1 is set in the terminal ID 241, the global IP address of the NAT entry is set in the terminal IP address 242, and the global port is set in the terminal port number 243. "800 sec" is set in the periodical transmission interval information 244 as a predetermined interval (cycle) at which the NAT update request packet is to be transmitted from the server 2 to the router 3 that performs the NAT traversal.

Figure 14:
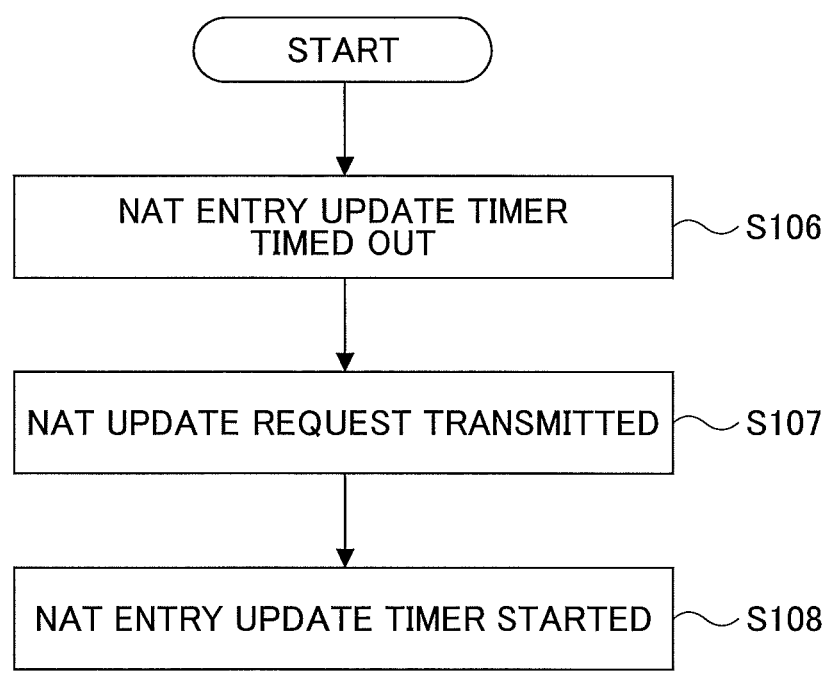
FIG. 14 is a flowchart of a LAN update request transmission process in S9 in FIG. 5.

In FIG. 5, then, the NAT control part 22 performs the NAT update request transmission process (step S9). As illustrated in FIG. 14, according to the NAT update request transmission process, the NAT control part 22 counts time with a NAT entry update timer, and transmits the NAT update request (step S107) at a lapse of 800 sec, which is periodical transmission interval, from the transmission timing of the previous NAT update request packet. The NAT control part 22 starts counting for the transmission of the next NAT update request packet with the NAT entry update timer (step S108).

Figure 15:
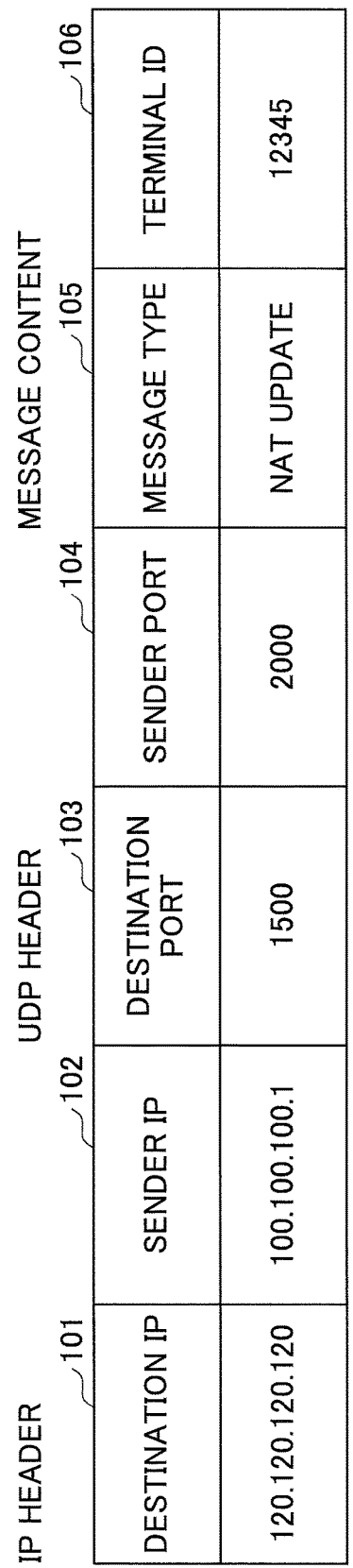
FIG. 15 is a diagram illustrating an example of a NAT update request transmitted from the server in S11 in FIG. 5.

In this way, In FIG. 5, the NAT control part 22 transmits the NAT update request (step S10). Then, the communication control part 21 transmits the IP packet of the NAT update request to the router 3 (step S11). According to the NAT update request packet illustrated in FIG. 15, a destination IP address 101 and a sender IP address 102 are set in an IP header, a destination port 103 and a sender port 104 are set in a UDP header, and a message type 105 and a terminal ID 106 are set in content of message. The global IP address "120.120.120.120" is set in the destination IP address 101, and the IP address "100.100.100.1" of the server 2 is set in the sender IP address 102. Further, the global port "1500" is set in the destination port 103, and the port "2000" of the server 2 is set in the sender port 104. The message type 105 is "NAT update", and the terminal ID 106 is "12345".

In FIG. 5, then, the communication control part 31 of the router 3a updates the NAT entry, and performs the address conversion from the global IP address to the private IP address (step S12). Then, the communication control part 31 transmits the IP packet of the NAT update request to the PC 1 (step S13). According to the IP packet of the NAT update request after the NAT conversion illustrated in FIG. 16, the private IP address "192.168.10.1" after the address conversion is set in the destination IP address 111, and the private port "1000" is set in the destination port 103.

Figure 17:
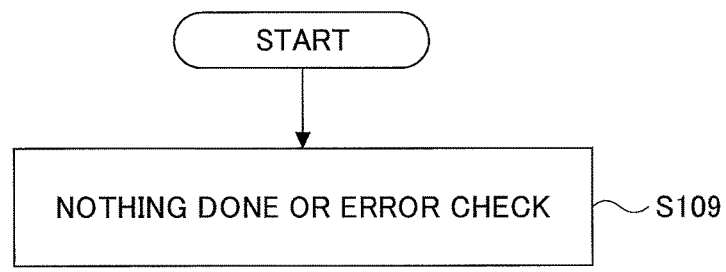
FIG. 17 is a flowchart of a NAT update request reception process in S15 in FIG. 5.

In FIG. 5, then, the communication control part 18 of the PC 1 transmits the NAT update request (step S14). The LAN registration part 15 performs the NAT update request reception process in response to the NAT update request (step S15). At that time, the NAT entry of the router 3 has been updated, there is no need for the PC 1 to perform any process. Therefore, illustrated in FIG. 17, in the NAT update request reception process, the LAN registration part 15 does nothing or performs an error check based on the received IP packet (step S109). For example, the LAN registration part 15 may check the terminal ID (see 116 in FIG. 16) included in the IP packet, and output an error display when the terminal ID different from that of the own PC is set.

Figure 18:
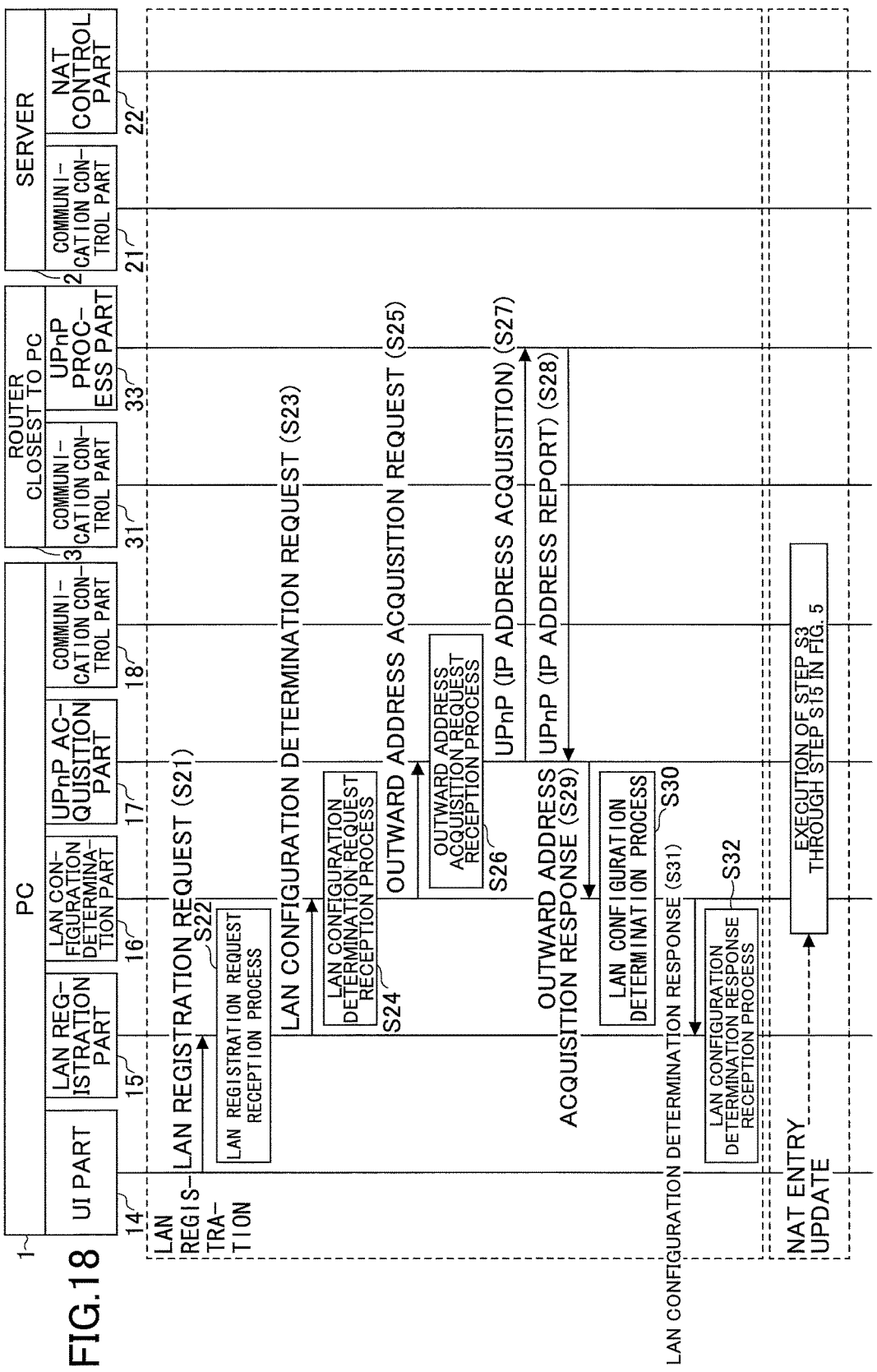
FIG. 18 is a flowchart of a NAT entry update process according to the first embodiment (in a single-stage or multiple-stage router configuration).

Next, a NAT entry update process in the case where the router configuration is in a single stage or multiple stages is explained with reference to FIG. 18. FIG. 18 is a flowchart of a NAT entry update process (in a single-stage or multiple-stage router configuration). In FIG. 18, the LAN registration process is performed, and then the NAT entry update process is performed. In the LAN registration process, a LAN configuration determination process is performed. In FIG. 18, the router 3b closest to the PC 1 and illustrated in FIG. 1B is illustrated as the router 3.

Figure 19:
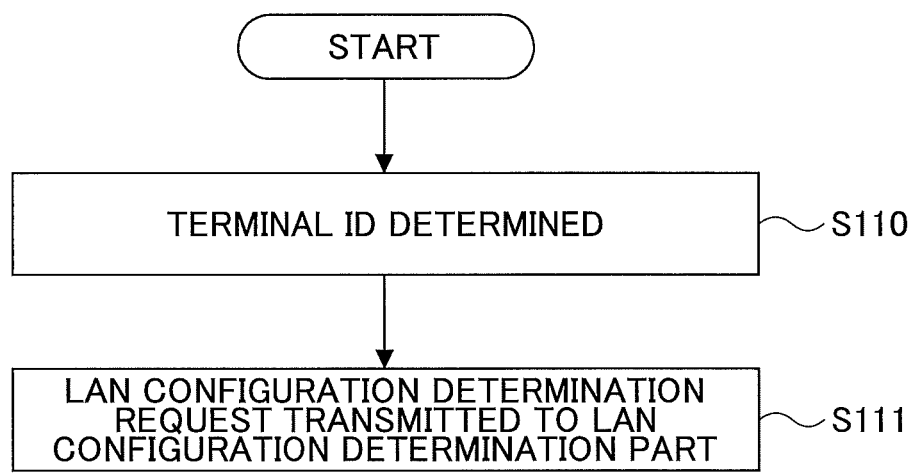
FIG. 19 is a flowchart of a LAN registration request reception process in S22 in FIG. 18.

At first, the UI part 14 of the PC 1 transmits the LAN registration request (step S21). Then, the LAN registration part 15 performs the LAN registration request reception process (step S22). According to the LAN registration request reception process in FIG. 19, the LAN registration part 15 determines a terminal ID (step S110), and transmits a LAN configuration determination request to the LAN configuration determination part 16 (step S111).

Figure 20:
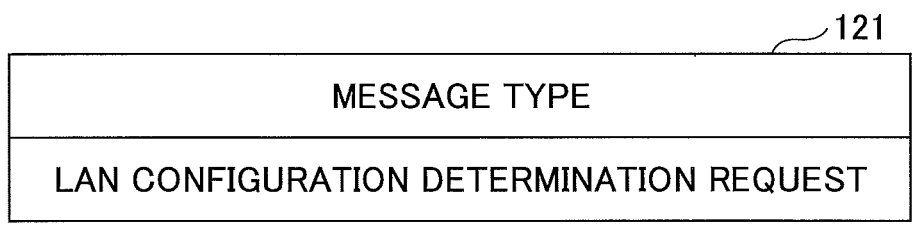
FIG. 20 is a diagram illustrating an example of a LAN configuration determination request in S23 in FIG. 18.

Accordingly, in step S23 illustrated in FIG. 18, the LAN configuration determination request is transmitted from the LAN registration part 15 to the LAN configuration determination part 16. In FIG. 20, an example of the LAN configuration determination request in which the message type 121 is set to the LAN configuration determination request.

Figure 21:
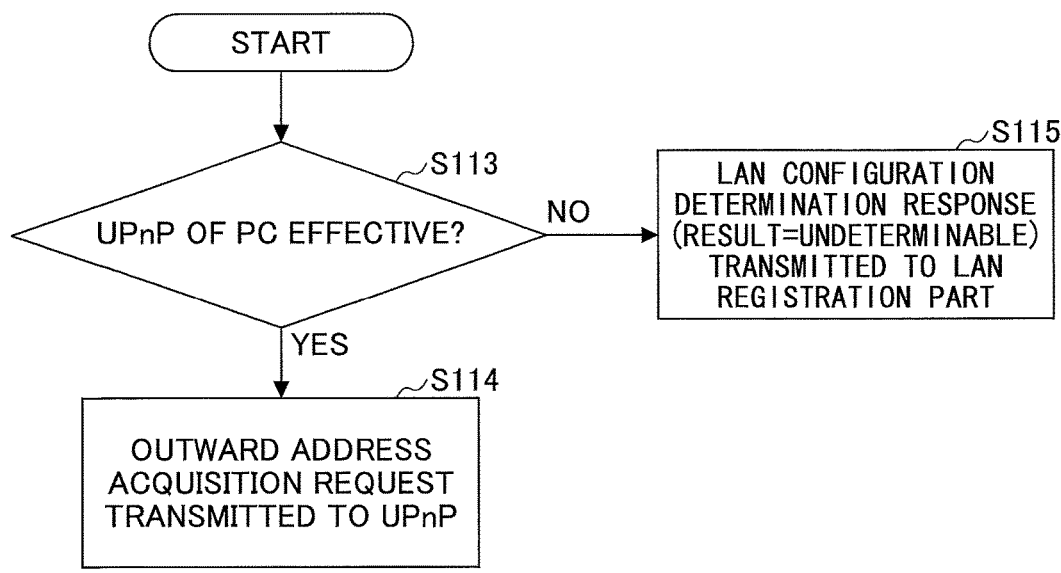
FIG. 21 is a flowchart of a LAN configuration determination request reception process in S24 in FIG. 18.

In FIG. 18, then, the LAN configuration determination part 16 performs a LAN configuration determination request reception process (step S24). According to the LAN configuration determination request reception process illustrated in FIG. 21, the LAN configuration determination part 16 determines whether the UPnP function of the PC 1 is effective (step S113). If the LAN configuration determination part 16 determines that the UPnP function of the PC 1 is effective, the LAN configuration determination part 16 transmits an acquisition request of an IP address (also referred to as "an outward address" hereinafter) to the UPnP acquisition part 17. If the LAN configuration determination part 16 determines that the UPnP function of the PC 1 is not effective, the LAN configuration determination part 16 transmits the response, which represents that the result of the LAN configuration determination is "undeterminable", to the LAN registration part 15.

In FIG. 18, then, the UPnP acquisition part 17 performs an outward address acquisition request reception process (step S26) in response to the acquisition request of the outward address of step (step S25). Then, the UPnP acquisition part 17 transmits the IP packet of the outward address acquisition request to the UPnP process part 33 of the router 3b adjacent to the PC 1 (step S27). The UPnP process part 33 transmits an IP packet for reporting the outward address (step S28).

Figure 22:
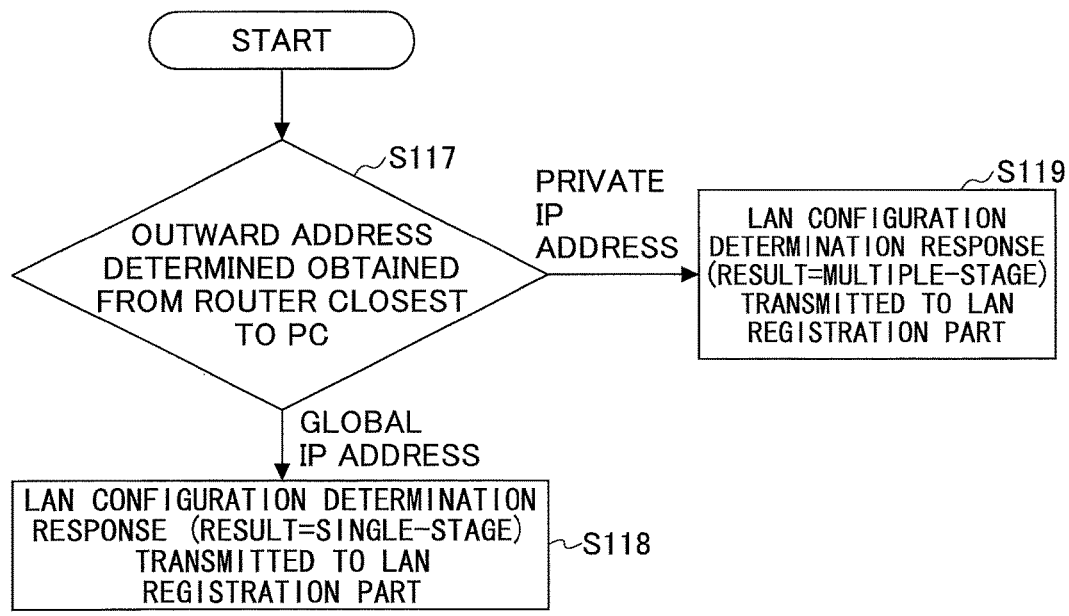
FIG. 22 is a flowchart of a LAN configuration determination process in S30 in FIG. 18.

Then, the UPnP acquisition part 17 transmits the acquisition response of the outward address (step S29). The LAN configuration determination part 16 performs the LAN configuration determination process (step S30). According to the LAN configuration determination process illustrated in FIG. 22, the LAN configuration determination part 16 determines the outward address (i.e., the network address) obtained from the router 3 closest to the PC 1 (step S117). If the LAN configuration determination part 16 determines that the obtained outward address is the global IP address, the LAN configuration determination part 16 determine that the router configuration is in a single stage such that the conversion to the global IP address is performed at the router 3 closest to the PC 1. Correspondingly, the LAN configuration determination part 16 transmits the response, which represents the determination result "single stage" of the router configuration of the LAN, to the LAN registration part 15 (step S118).

On the other hand, in step S117, the LAN configuration determination part 16 determines that the outward address is the private IP address, the LAN configuration determination part 16 determines that the LAN 11 includes another router that performs the conversion from the private IP address to the global IP address. Correspondingly, the LAN configuration determination part 16 determines that the router configuration in the LAN 11 is in multiple stages. Thus, the LAN configuration determination part 16 transmits the response, which represents the result "multiple stage (two or more stages)" of the LAN configuration determination, to the LAN registration part 15 (step S119).

In FIG. 18, then, the LAN registration part 15 receives the response of LAN configuration determination (step S31). According to an example of the LAN configuration determination response illustrated in FIG. 23, "LAN configuration determination response" is set in a message type 123, and "single stage/multiple stages/undeterminable" is set in result information 124.

Figure 24:
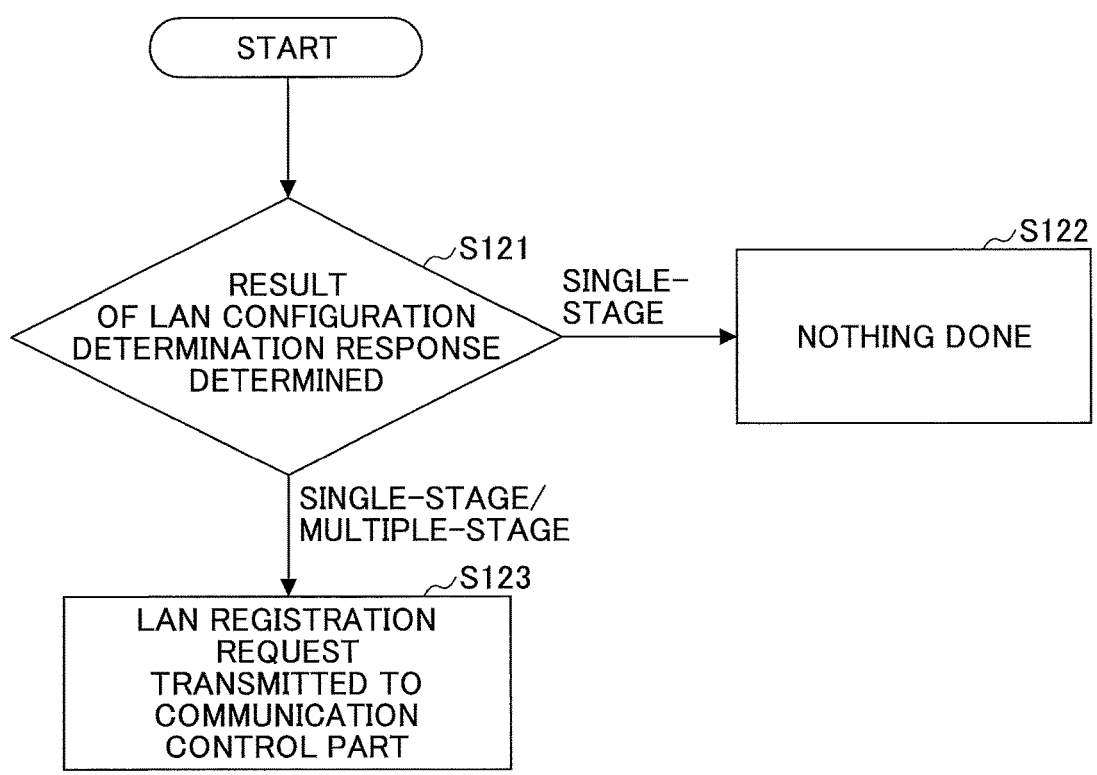
FIG. 24 is a flowchart of a LAN configuration determination response reception process in S32 in FIG. 18.

In FIG. 18, then, the LAN registration part 15 performs a LAN configuration determination response reception process (step S32). According to the LAN configuration determination response reception process illustrated in FIG. 24, the LAN registration part 15 determines the result of LAN configuration determination response (step S121). If the LAN registration part 15 determines that the router configuration is in a single stage, the LAN registration part 15 determines that the NAT entry is not to be deleted even upon no communication for the predetermined time. Thus, the LAN registration part 15 determines that the transmission of the NAT update request packet from the server 2 is not necessary and thus does nothing (step S122). On the other hand, if the LAN registration part 15 determines that the router configuration is in multiple stages, the LAN registration part 15 transmits the LAN registration request to the communication control part 18 (step S123). It is noted that the periodical transmission process of the NAT update request packet by the server 2 in response to the LAN registration request is performed as described above with reference to step S3 through step S15 illustrated in FIG. 15, thus the explanation thereof is omitted.

Thus, according to the embodiment, the PC 1 determines the router configuration in the LAN 11, and if the PC 1 determines that the router configuration is in multiple stages, the PC 1 transmits the LAN registration request to the server 2. The server 2 periodically transmits the IP address of the NAT update request at a predetermined interval (5 sec, for example) in response to the LAN registration request. With this arrangement, even if the router configuration in the LAN 11 is in multiple stages, it becomes possible to prevent the deletion of the NAT entry upon no communication for a predetermined time.

As described above, according to the communication system 10 of the first embodiment, because the PC 1 determines the router configuration of the LAN to which the PC 1 is coupled, the PC 1 can determine whether the periodical transmission of the IP packet of the NAT update request from the server 2 is necessary. Thus, even if the router configuration is in multiple stages, it becomes possible to have the NAT entry continuously stored in the router, which enables keeping a state in which the NAT traversal can be performed. It is noted that, in the case of the single-stage router configuration, it is configured such that the NAT entry set by the router whose UPnP function is effective is not deleted. Therefore, if it is determined that the router configuration is in single stage, the PC 1 does not transmit the LAN registration request, and thus the NAT update request packet is not transmitted from the server 2. As a result of this, it becomes possible to reduce the load of the server 2 as well as traffic of the network.

Second Embodiment

Figure 25:
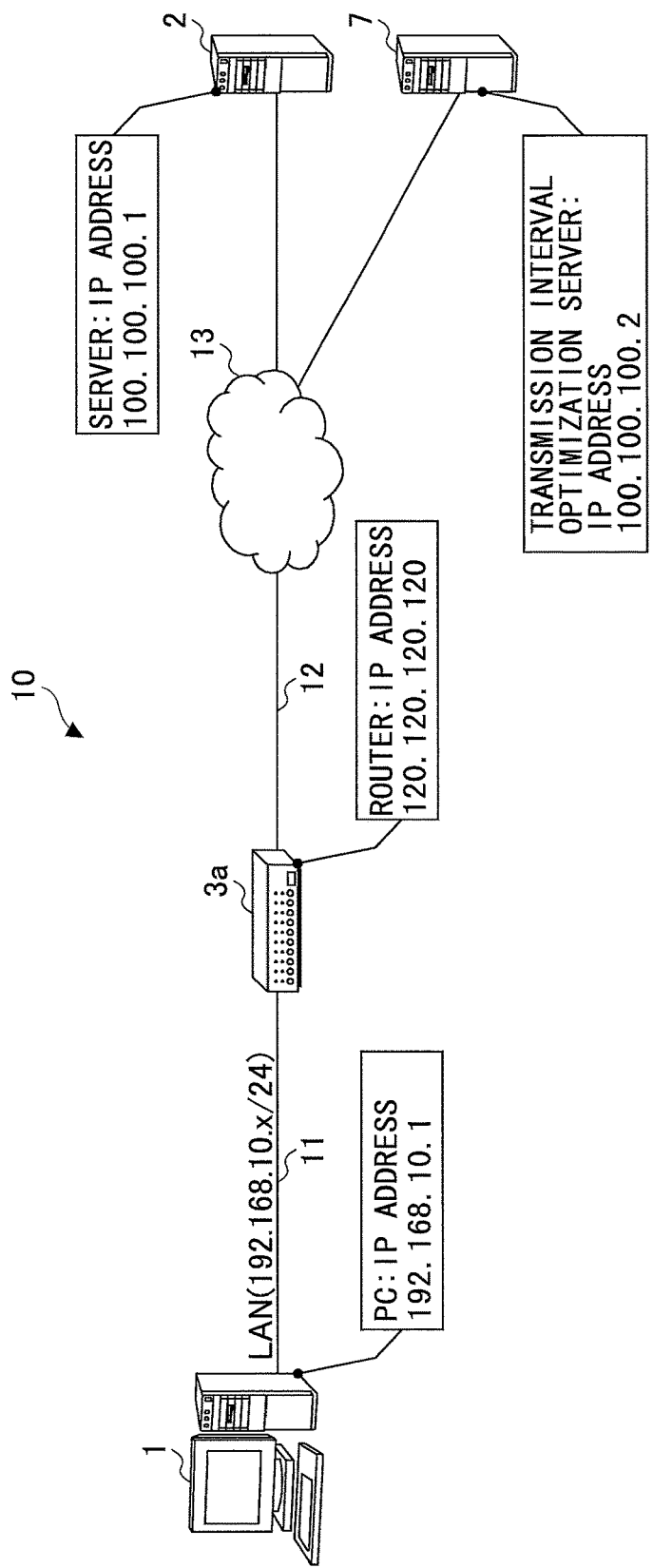
FIG. 25 is a diagram illustrating a communication system according to a second embodiment.
Figure 26:
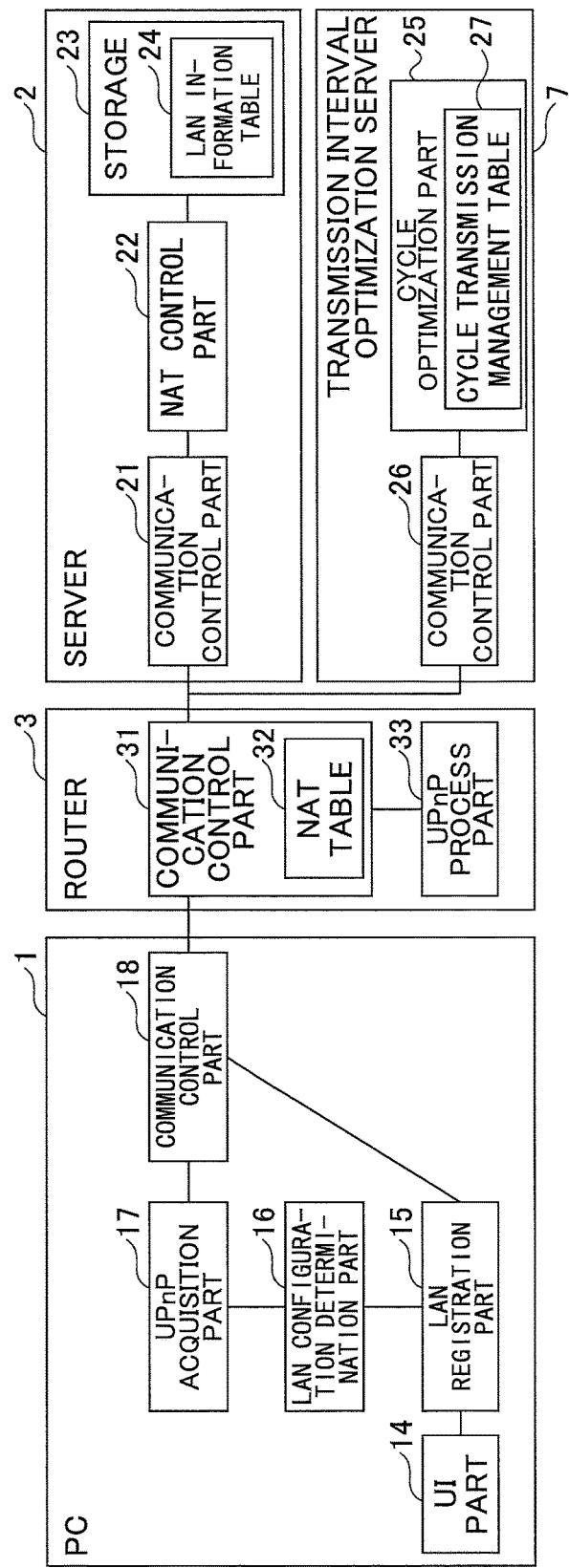
FIG. 26 is a diagram illustrating a function configuration of a PC, a server, and a router according to the second embodiment.

Next, an overall configuration and a function configuration of a communication system 10 according to a second embodiment of the present invention is explained with reference to FIG. 25 and FIG. 26. FIG. 25 is a diagram illustrating the communication system 10 according to the second embodiment. FIG. 26 is a diagram illustrating a function configuration of a PC 1, a server 2, and a router 3 according to the second embodiment. The second embodiment differs from the first embodiment in that there is a transmission interval optimization server 7 in addition to the server 2. It is noted that, in FIG. 25, a router configuration of the router 3 (router 3a) is in a single stage; however, the router configuration may be in multiple stage.

As illustrated in FIG. 26, a function configuration of the PC 1, the server 2, and the router 3 are the same as that according to the first embodiment. The transmission interval optimization server 7 added according to the second embodiment includes an cycle optimization part 25 and a communication control part 26. The cycle optimization part 25 controls the transmission interval of the NAT update request packet. The cycle optimization part 25 stores, in a cycle transmission management table 27, information for controlling the transmission interval of the NAT update request packet. The communication control part 26 controls the communication with other apparatuses with TCP/IP.

Figure 27:
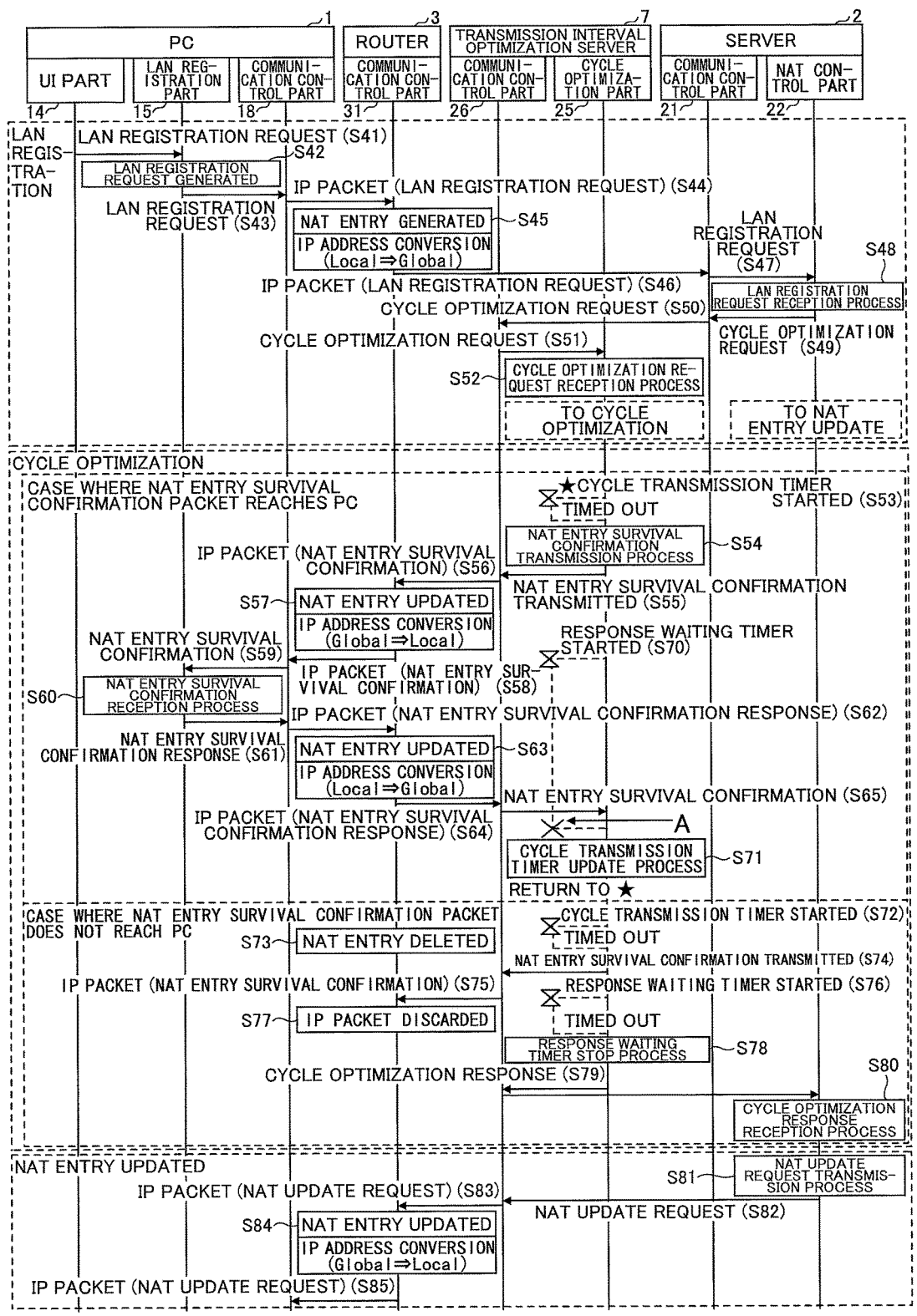
FIG. 27 is a flowchart of a NAT update cycle optimization process according to the second embodiment.

Next, a NAT update cycle optimization process according to the embodiment is explained with reference to FIG. 27. FIG. 27 is a flowchart illustrating the NAT update cycle optimization process. In FIG. 27, the LAN registration process and the NAT entry update process according to the first embodiment are performed in the server 2, and the NAT update cycle optimization process of the NAT update request packet is performed in the transmission interval optimization server 7.

When the NAT update cycle optimization process is started, at first, the UI part 14 of the PC 1 transmits the LAN registration request (step S41). As illustrated in FIG. 28, according to an example of information included in the LAN registration request, "LAN registration request" is set in a message type 126, "800 sec" is set in periodical transmission interval information 127, and "YES" is set in optimization information 128. The parameter of the optimization information 128 is set to "YES", if a user checks a box "optimization" on the screen of the UI part 14, for example.

The LAN registration part 15 generates the LAN registration request (step S42), and transmits the LAN registration request (step S43). Then, the communication control part 18 transmits the IP packet of the LAN registration request to the router 3 (step S44). The IP packet of the LAN registration request illustrated in FIG. 29 is transmitted from the PC 1 to the router 3. In the IP packet of the LAN registration request, a destination IP address 131, a sender IP address 132, a destination port 133, a sender port 134, a message type 135, a terminal ID 136, periodical transmission interval information 137, and optimization information 138. The IP address "100.100.100.1" of the server 2 is set in the destination IP address 131, and the IP address "192.168.10.1" of the PC 1 is set in the sender IP address 132. Further, the port "2000" of the server 2 is set in the destination port 133, and the port "1000" of the PC 1 is set in the sender port 134. Further, "LAN registration" is set in the message type 135, "12345" is set in the terminal ID 136, "800 sec" is set in the periodical transmission interval information 137, and "YES" is set in the optimization information 138.

Figure 30:
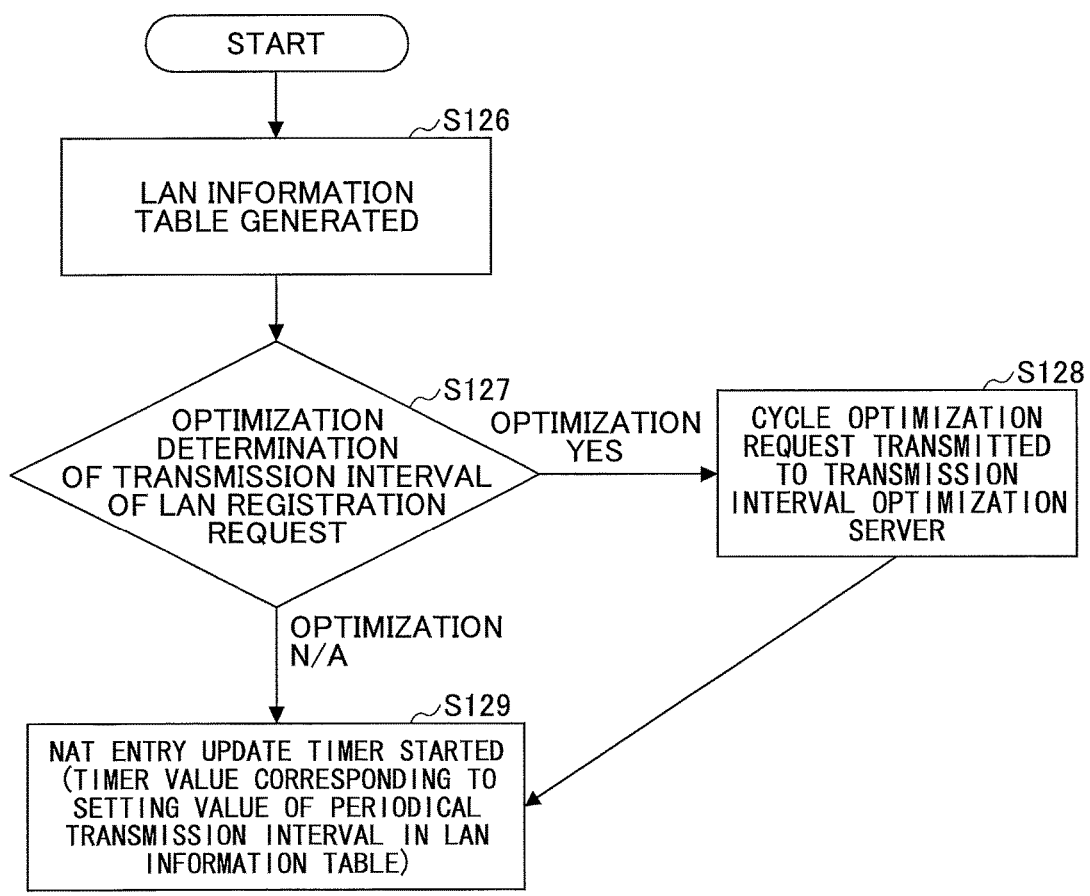
FIG. 30 is a flowchart of a LAN registration request reception process in S48 in FIG. 27.

In FIG. 27, then, the communication control part 31 of the router 3 generates the NAT entry (step S45), and converts the IP address from the private IP address form to the global IP address form. Then, the communication control part 31 transmits the IP packet of the LAN registration request after the NAT conversion to the server 2 (step S46). Then, the communication control part 21 of the server 2 receives the IP packet of the LAN registration request after the NAT conversion, and transmits the LAN registration request to the NAT control part 22 (step S47). The NAT control part 22 performs the LAN registration request reception process (step S48). As illustrated in FIG. 30, in the LAN registration request reception process, the NAT control part 22 generates the LAN information table 24 (step S126). Then, the NAT control part 22 determines the optimization of the transmission interval of the LAN registration request (step S127). If "YES" is set in optimization information of the LAN registration request transmitted by the PC 1 (see 138 in FIG. 29), the NAT control part 22 transmits a cycle optimization request to the transmission interval optimization server 7 (step S128). On the other hand, if "N/A" is set in optimization information of the LAN registration request transmitted by the PC 1, the NAT control part 22 starts a NAT entry update timer (step S129). Here, the timer value to be measured is a setting value of the periodical transmission interval of the LAN information table 24 (see 244 in FIG. 13).

In FIG. 27, correspondingly, the communication control part 21 receives the cycle optimization request (step S49) from the NAT control part 22 to transmit the packet of the cycle optimization request to the transmission interval optimization server 7 (step S50). In FIG. 31, an example of information included in the cycle optimization request. The IP address "100.100.100.2" of the transmission interval optimization server 7 is set in the destination IP address 141, and the IP address "100.100.100.1" of the server 2 is set in the sender IP address 142. Arbitrary port numbers used for the communication between the servers are set in the destination port 143 and the sender port 144. Further, "cycle optimization request" is set in the message type 145, and "12345" is set in the terminal ID 146. The IP address "120.120.120.120" of the router 3a is set in the terminal IP address 147, and "1200" is set in the terminal port number 148.

Figure 32:
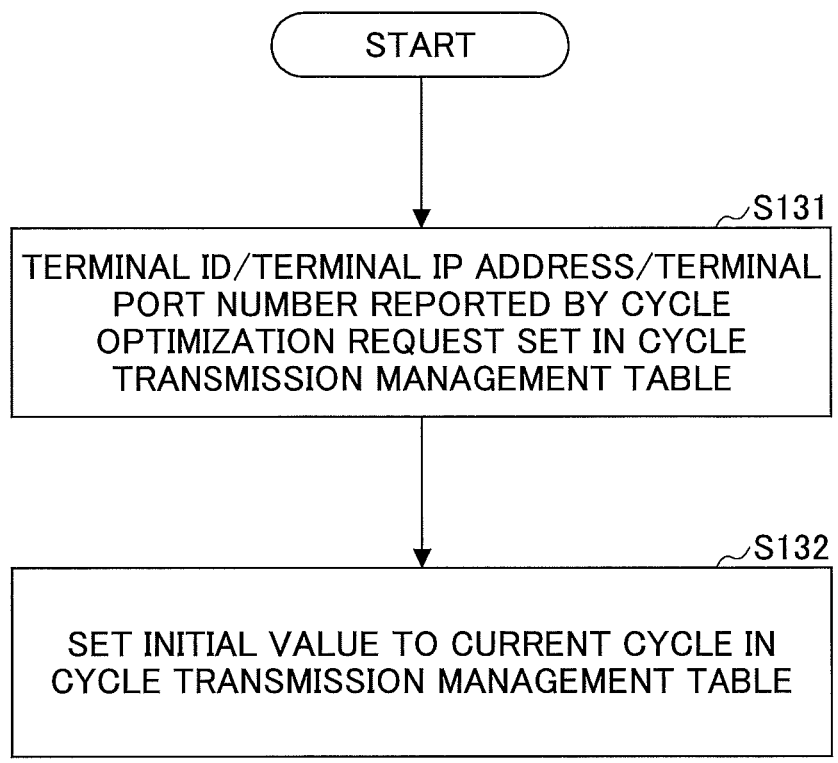
FIG. 32 is a flowchart of a cycle optimization request reception process in S52 in FIG. 27.

Then, the communication control part 26 transmits the cycle optimization request to the cycle optimization part 25 (step S51). The cycle optimization part 25 performs a cycle optimization request reception process (step S52). As illustrated in FIG. 32, according to the cycle optimization request reception process, cycle optimization part 25 sets, in the cycle transmission management table 27, the terminal ID, the terminal IP address, and the terminal port number reported by the cycle optimization request.

In FIG. 33, as an example of the cycle transmission management table 27, the terminal ID 151, the terminal IP address 152, the terminal port number 153, the current cycle 154, and the latest cycle 155. The terminal ID "12345" of the PC 1 is set in the terminal ID 151, the IP address "120.120.120.120" of the router 3 is set in the terminal IP address 152. Further, the current cycle is set to the cycle which the server 2 uses (i.e., the setting value of the periodical transmission interval in the LAN information table 24), and the latest cycle is set to "0".

Under such a situation, the server 2 periodically transmits the NAT update request packet based on the setting value of the periodical transmission interval in the LAN information table 24. The NAT entry update process (step S81 through step S85) is described hereinafter.

Figure 34:
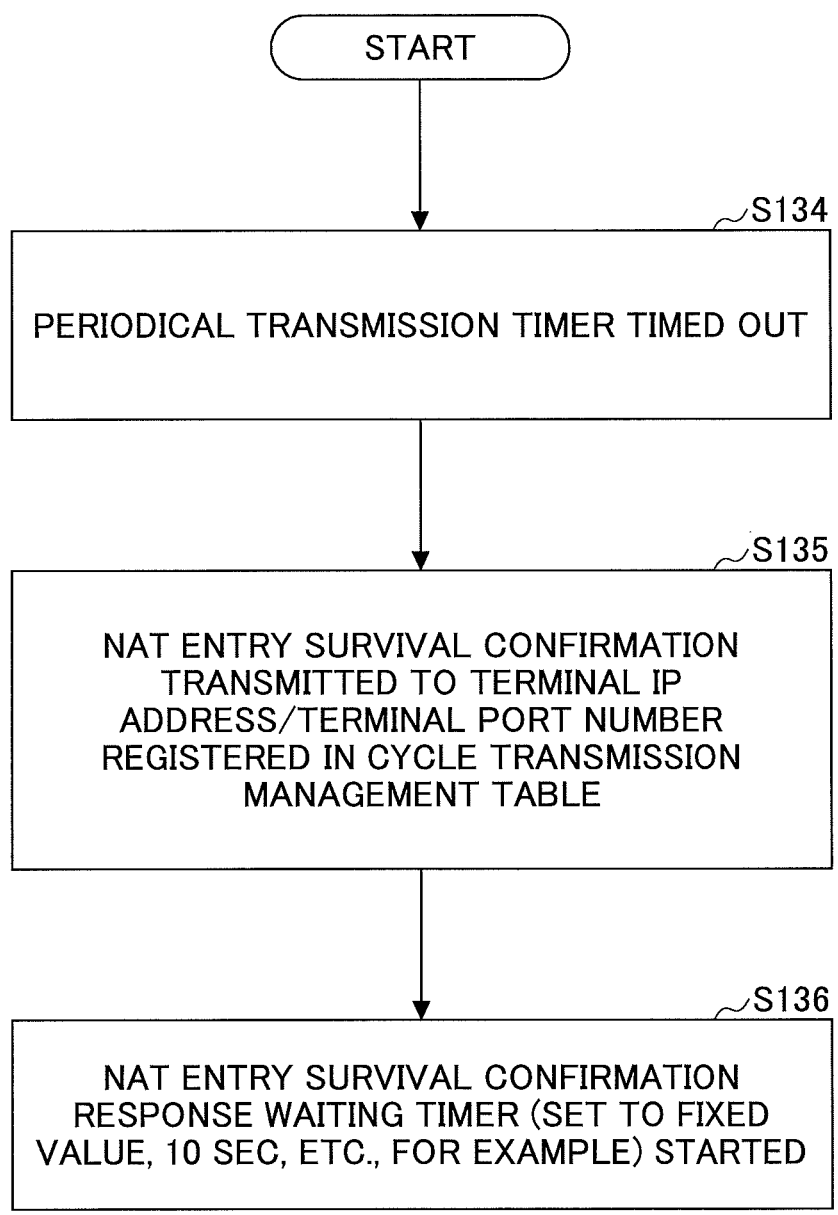
FIG. 34 is a flowchart of a NAT entry survival confirmation transmission process in S54 in FIG. 27.

The transmission interval optimization server 7 performs a NAT entry update cycle optimization process (step S53 through step S80), concurrently with the NAT entry update process performed by the server 2. Specifically, the cycle optimization part 25 starts counting the periodical transmission interval with a periodical transmission timer (step S53). When the periodical transmission timer times out, the transmission interval optimization server 7 performs a NAT entry survival confirmation transmission process (step S54). As illustrated in FIG. 34, according to the NAT entry survival confirmation transmission process, when the timer times out (step S134), the cycle optimization part 25 transmits a NAT entry survival confirmation to the destination of the terminal IP address and the terminal port number registered in the cycle transmission management table 27 (step S135). Correspondingly, the NAT entry survival confirmation is reported to the router 3. Then, the cycle optimization part 25 starts a NAT entry survival confirmation response waiting timer (fixed value, 10 sec, etc., for example) (step S136).

In FIG. 27, correspondingly, the communication control part 26 of the transmission interval optimization server 7 receives the NAT entry survival confirmation from the cycle optimization part 25 (step S55), and transmits the IP address of the NAT entry survival confirmation to the communication control part 31 (step S56). In FIG. 35, an example of information included in the NAT entry survival confirmation is illustrated. The global IP address "120.120.120.120" is set in the destination IP address 161, and the IP address "100.100.100.2" of the transmission interval optimization server 7 is set in the sender IP address 162. Further, the global port "1200" is set in the destination port 163, and the port "2000" of the transmission interval optimization server 7 is set in the sender port 164. With respect to the message content, "survival confirmation" is set in the message type 164, and "12345" is set in the terminal ID of the PC 1.

It is noted that the IP address of the NAT entry survival confirmation is an example of a test packet transmitted at a varied interval from the transmission interval optimization server 7 different from the server 2 that transmits the NAT update request packet. According to the embodiment, the test packet is transmitted at the interval that gradually increases.

Figure 36:
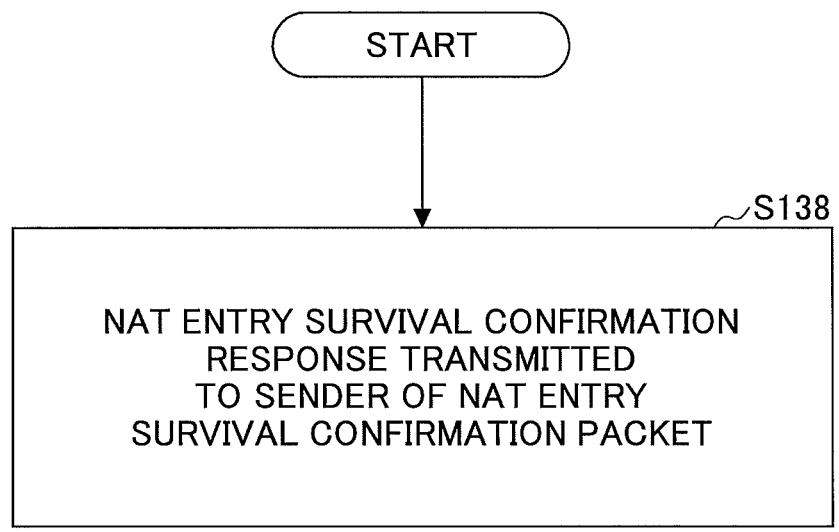
FIG. 36 is a flowchart of a NAT entry survival confirmation transmission process in S54 in FIG. 27.

The communication control part 31 updates the NAT entry to perform the address conversion from the global IP address to the private IP address (step S57). Then, the communication control part 31 transmits the IP packet of the NAT entry survival confirmation to the PC 1 (step S58). Then, the communication control part 18 of the PC 1 transmits the IP packet of the NAT entry survival confirmation to the LAN registration part 15 (step S59). The LAN registration part 15 performs a NAT entry survival confirmation reception process (step S60). As illustrated in FIG. 36, according to the NAT entry survival confirmation reception process, the LAN registration part 15 transmits a NAT entry survival confirmation response to the sender of the IP address of the NAT entry survival confirmation (step S138). In FIG. 27, correspondingly, the communication control part 18 receives the NAT entry survival confirmation response transmitted by the LAN registration part 15 (step S61), and transmits the IP address of the NAT entry survival confirmation response to the router 3 (step S62). In FIG. 37, an example of information included in the NAT entry survival confirmation response is illustrated. The transmission interval optimization server 7 which is the sender of the IP address of the NAT entry survival confirmation is set in the destination IP address 171, and the IP address of the PC 1 is set in the sender IP address 172. "survival confirmation response" is set in the message type 175, and the ID "12345" of the PC 1 is set in the terminal ID. It is noted that the IP address of the NAT entry survival confirmation response is an example of a response packet responding to the NAT entry survival confirmation.

In FIG. 27, then, the router 3 updates the NAT entry, and performs the address conversion from the global IP address to the private IP address (step S63). Then, the communication control part 31 transmits the IP packet of the NAT entry survival confirmation response to the PC 7 (step S64). Then, the communication control part 26 of the transmission interval optimization server 7 transmits the NAT entry survival confirmation response to the cycle optimization part 25 (step S65).

Figure 38:
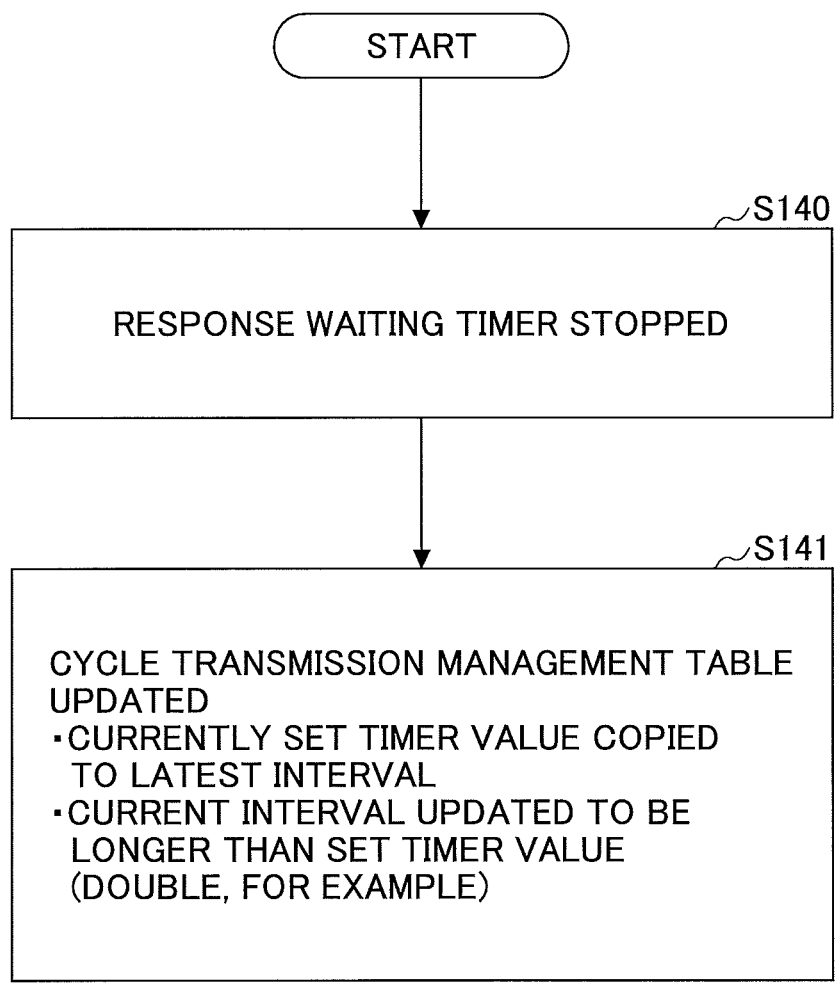
FIG. 38 is a flowchart of a cycle transmission timer update process (at the time of the NAT entry survival confirmation response reception) in S71 in FIG. 27.

On the other hand, the cycle optimization part 25 starts a response waiting timer (step S70) in synchronization with the timing when the NAT entry survival confirmation is transmitted in step S55. In FIG. 27, the NAT entry survival confirmation response of step S65 has reached the cycle optimization part 25 before the time-out (see point A in FIG. 27) of the response waiting timer (10 sec, for example). Then, the cycle optimization part 25 determines that the NAT entry survival confirmation response has successfully reached within the response waiting time, and performs a periodical transmission timer update process (step S71). As illustrated in FIG. 38, according to the periodical transmission timer update process, the cycle optimization part 25 stops the response waiting timer (step S140). Then, the cycle optimization part 25 updates the cycle transmission management table 27 (step S141). In FIG. 39, an example of the cycle transmission management table 27 is illustrated. In step S141, the cycle optimization part 25 copies the timer value (800 sec) set in the current interval 184 to the latest interval 185, and updates the current interval 184 such that the updated timer value (doubled 1600 sec, for example) is longer than the set timer value.

Then, the cycle optimization part 25 returns to step S53 to repeat the processes from step S53. In the foregoing, a series of processes in the case where the NAT entry survival confirmation packet has reached the PC 1 is described above in step S53 through step S71. Next, series of processes (step S72 through step S80) in the case where the NAT entry survival confirmation packet has not reached the PC 1 is described.

The cycle optimization part 25 starts counting the periodical transmission interval with the periodical transmission timer (step S72). The router 3a deletes the NAT entry due to no communication for the predetermined time before the time-out of the periodical transmission timer (step S73).

When the periodical transmission timer times out, the cycle optimization part 25 transmits the NAT entry survival confirmation (step S74), and the communication control part 26 transmits the IP address thereof to the router 3 (step S75). Concurrently, the cycle optimization part 25 starts the NAT entry survival confirmation response waiting timer (step S76).

Figure 40:
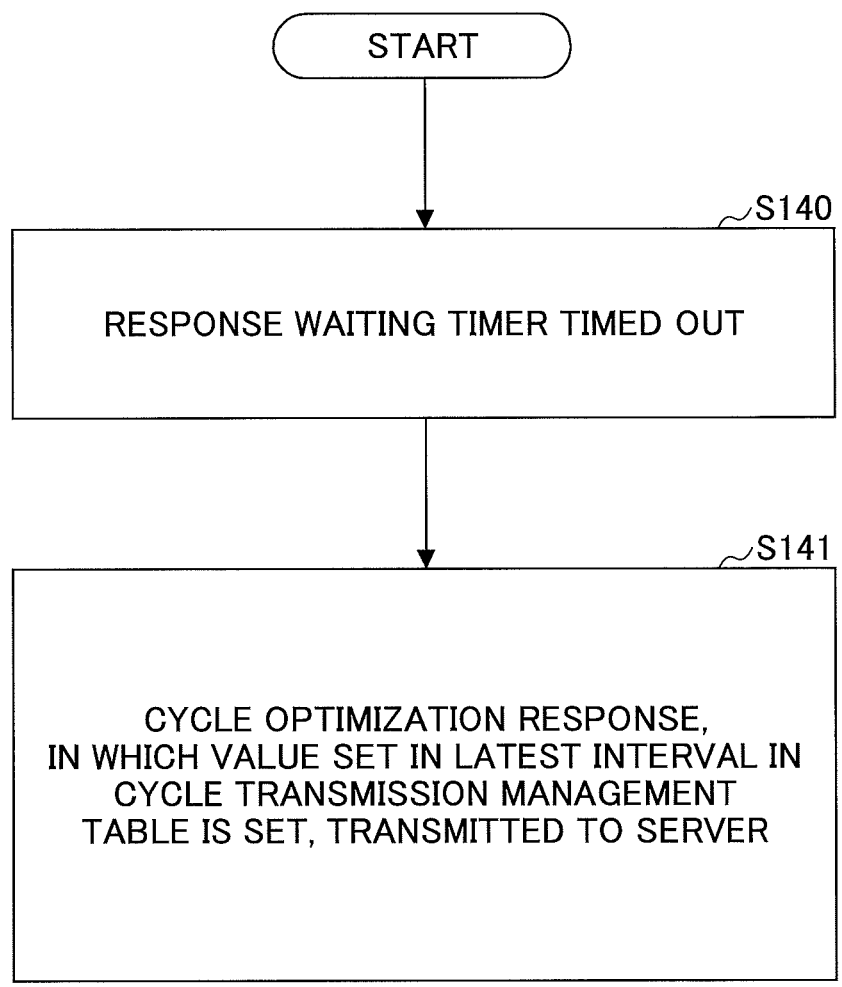
FIG. 40 is a flowchart of a response waiting timer time-out process in S78 in FIG. 27.

Because the NAT entry has been deleted, the communication control part 31 fails the address conversion from the global IP address to the private IP address to reject the IP address (step S77). If the response waiting timer has timed out without the NAT entry survival confirmation response from the PC 1 being received by the transmission interval optimization server 7, the cycle optimization part 25 correspondingly performs a response timer stop process (step S78). According to the response timer stop process illustrated in FIG. 40, when the response waiting timer has timed out (step S140), the cycle optimization part 25 sets, in a cycle timer 197 of a cycle optimization response illustrated in FIG. 41, the timer value set in the latest interval (see 185 in FIG. 39) in the cycle transmission management table 27. The cycle optimization part 25 transmits the cycle optimization response to the server 2 (step S141).

Figure 42:
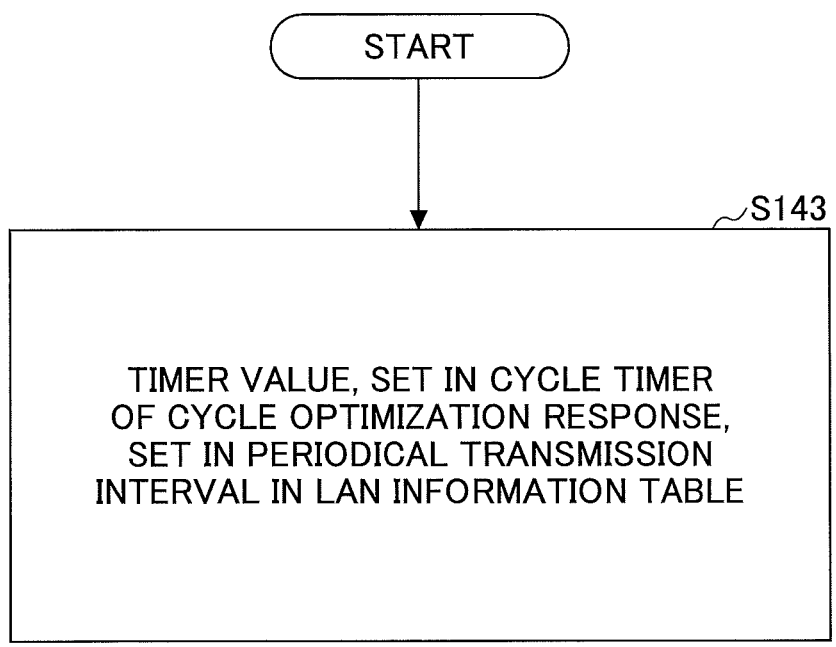
FIG. 42 is a flowchart of a cycle optimization response reception process in S80 in FIG. 27.

In FIG. 27, correspondingly, the cycle optimization part 25 transmits the cycle optimization response to the communication control part 26 (step S79). The NAT control part 22 receives the IP packet of the cycle optimization response to perform a cycle optimization response reception process (step S80). As illustrated in FIG. 42, the NAT control part 22 sets, in the periodical transmission interval in the LAN information table 24, the timer value set in the cycle timer of the cycle optimization response.

In the NAT update request transmission process, the NAT control part 22 sets the periodical transmission interval in the LAN information table 24 to the cycle timer of the cycle optimization response, and transmits the NAT update request when the cycle timer updated based on the newly set periodical transmission interval has timed out (step S82). The IP packet of the NAT update request is transmitted to the router 3 (step S83), causing the router 3 to update the NAT entry, and after having been subject to the address conversion (step S84), transmitted to the PC 1 (step S85).

As described above, the NAT update request packet is transmitted from the server 2 to prevent the deletion of the NAT entry upon no communication for the predetermined time. For this reason, the transmission interval optimization server 7 according to the embodiment transmits the test packets at the transmission interval that gradually increases. When the response packet is not returned in response to the test packet, the transmission interval used immediately before the latest transmission interval is set to the value of the periodical transmission interval. Then, the NAT update request packet is transmitted from the server 2 at the determined periodical interval. With this arrangement, it becomes possible to optimize the periodical transmission interval of the NAT update request packet such that the periodical transmission interval is the longest without causing the deletion of the NAT entry. As a result of this, it becomes possible to reduce the load of the server 2 as well as traffic of the network.

Third Embodiment

Figure 43:
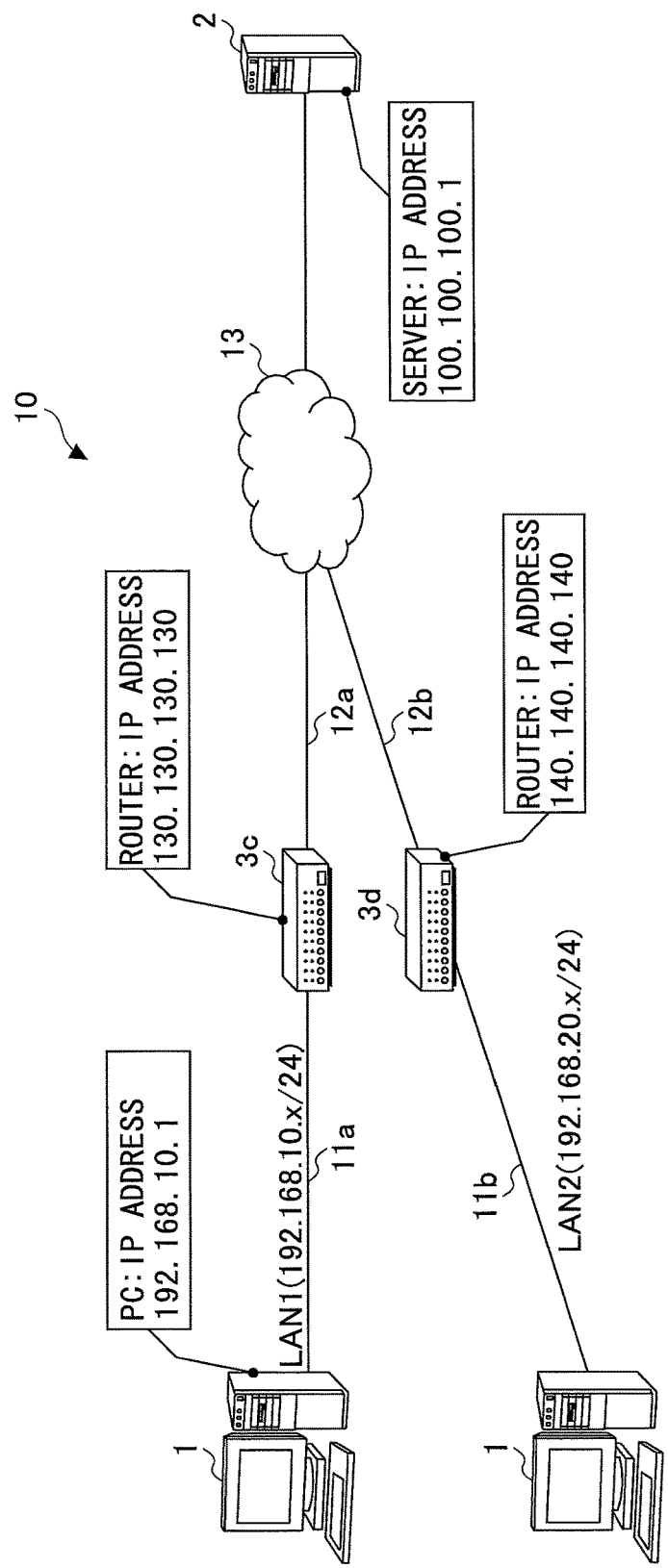
FIG. 43 is a diagram illustrating a communication system according to a third embodiment.
Figure 44:
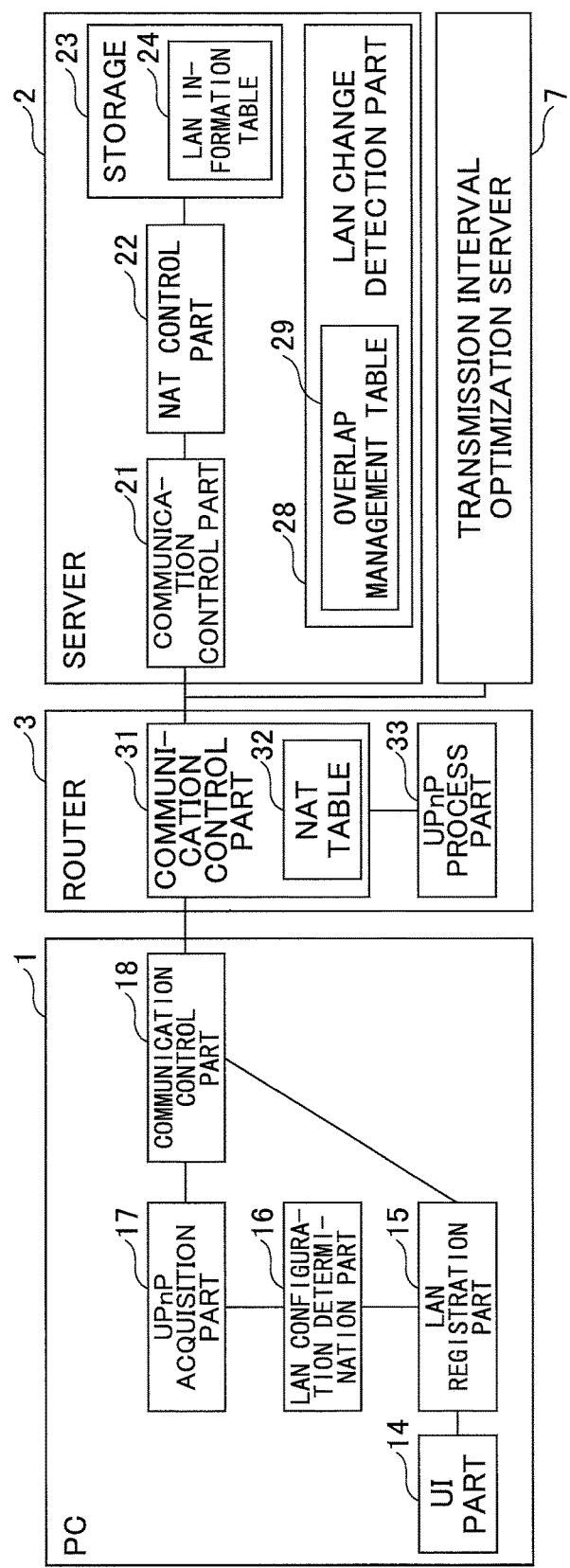
FIG. 44 is a diagram illustrating a function configuration of a PC, a server, and a router according to the third embodiment.

Next, an overall configuration and a function configuration of a communication system 10 according to a third embodiment of the present invention is explained with reference to FIG. 43 and FIG. 44. FIG. 43 is a diagram illustrating the communication system 10 according to the third embodiment. FIG. 44 is a diagram illustrating a function configuration of a PC 1, a server 2, and a router 3 according to the third embodiment. The third embodiment differs from the first embodiment in that the LAN that is coupled to the PC 1 is changed from a LAN 1 (LAN 11a) to a LAN 2 (LAN 11b). Correspondingly, the router 3 is changed from a router 3c to a router 3d. It is noted that, in FIG. 43, a router configuration of the router 3 is in a single stage; however, the router configuration may be in multiple stages.

As illustrated in FIG. 44, a function configuration of the PC 1, the router 3, and the transmission interval optimization server 7 are the same as that according to the second embodiment. According to the embodiment, the transmission interval optimization server 7 may be omitted. The server 2 includes a LAN change detection part 28 in addition to the function configuration (see FIG. 4) according to the first embodiment. The LAN change detection part 28 stores, in an overlap management table 29, information of the LAN that is coupled to the PC 1. The LAN change detection part 28 detects, based on the overlap management table 29, a plurality of LANs that are coupled to the same PC 1. If the LAN to which the PC 1 is coupled has been changed, the NAT control part 22 stops the transmission of the NAT update request packet to the LAN to which the NAT update request packet is transmitted before the change.

Figure 45:
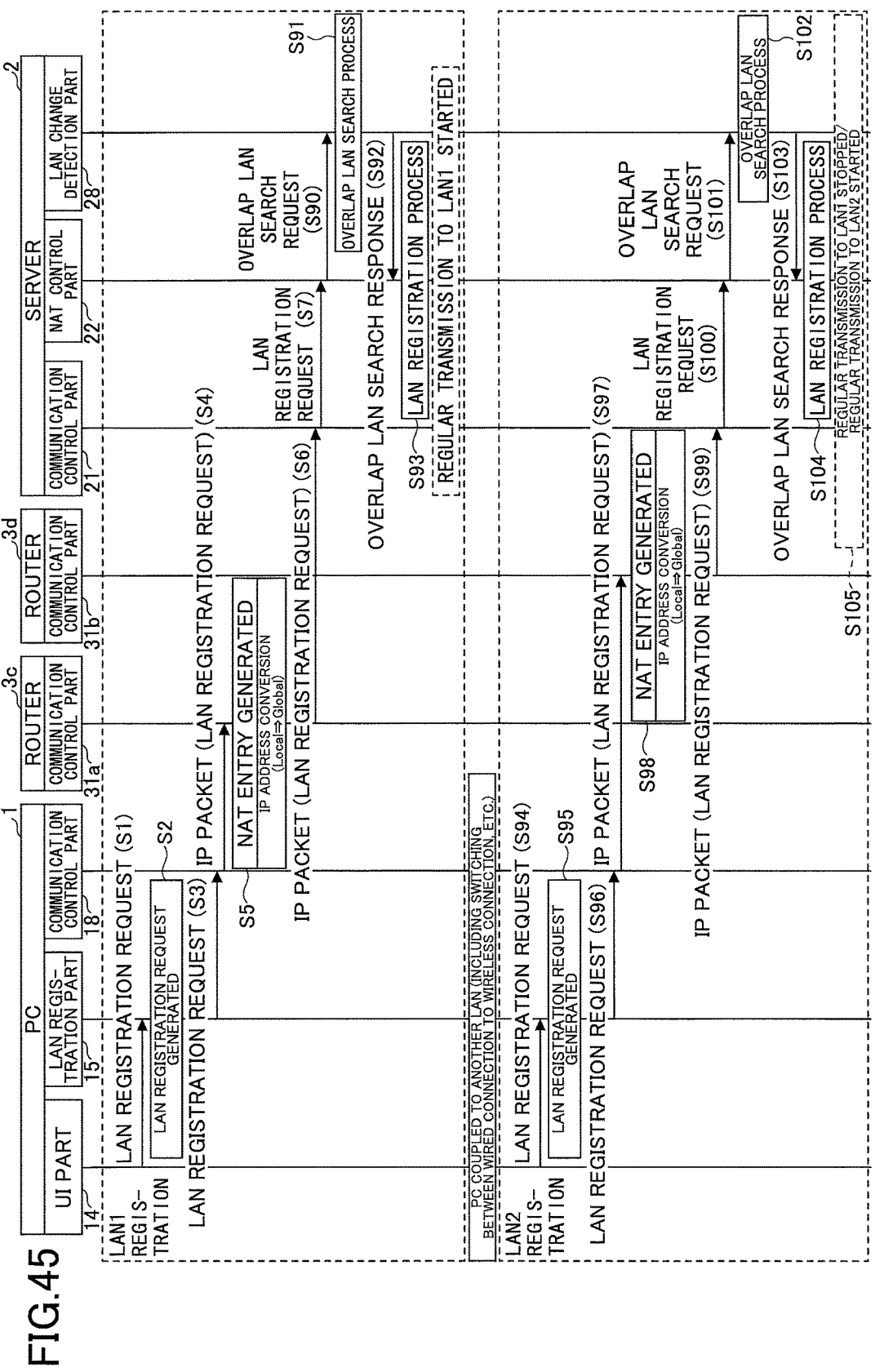
FIG. 45 is a flowchart of a LAN change process according to the third embodiment.

In the following, a LAN change process is explained with reference to FIG. 45. FIG. 45 is a flowchart of the LAN change process according to the third embodiment. In FIG. 45, the LAN registration request (LAN1 registration request) at the first time is performed, and then the LAN registration requests (LAN2 registration request) at the second time and thereafter is performed. According to the LAN registration requests at the second time and thereafter, an overlap LAN search process and the LAN change process are performed. It is assumed that the LAN to which the PC 1 is initially coupled is LAN1.

The LAN1 registration is described. At first, the UI part 14 of the PC 1 transmits the LAN registration request (step S21). The LAN registration request is transmitted to the NAT control part 22 of the server 2 after having been subjected to the address conversion at the router 3c (step S2 through step S7). The NAT control part 22 transmits an overlap LAN search request (step S9). According to the overlap LAN search request illustrated in FIG. 46, "overlap LAN search request" is set in a message type 201, "12345" is set in a terminal ID, "130.130.130.130" is set in a terminal IP address 203, and "1300" is set in a terminal port number. The NAT control part 22 reports the IP address (outward address) and the port number of the IP packet of the received LAN registration request to the LAN change detection part 28. It is noted that the terminal ID is an example of identification information of the communication apparatus, and the IP address and the port number of are an example of LAN identification information.

Figure 47:
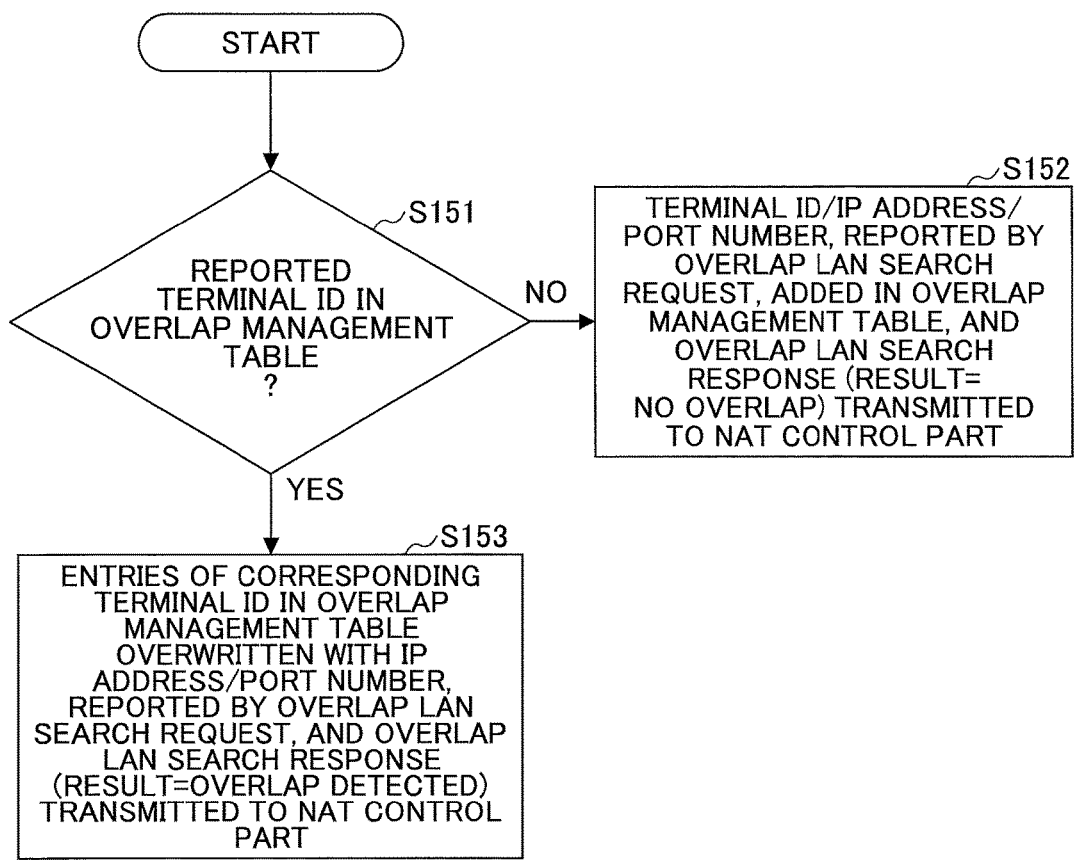
FIG. 47 is a flowchart of an overlapped LAN search process in S91 in FIG. 45.

The LAN change detection part 28 performs an overlap LAN search process (step S91). As illustrated in FIG. 47, the LAN change detection part 28 determines whether the reported terminal ID exists in the overlap management table 29 (step S151). At that time, the reported terminal ID has not been registered yet in the overlap management table 29. Thus, the LAN change detection part 28 adds, in the overlap management table 29, the terminal ID, the IP address, and the port number that are reported with the overlap LAN search request, and transmits an overlap LAN search response, which includes the search result indicative of no overlap, to the NAT control part 22. Step S153 illustrated in FIG. 47 is described hereinafter. In FIG. 48, an example is illustrated in which the terminal ID, the IP address, and the port number that are reported with the overlap LAN search request are registered in a terminal ID 211, a terminal IP address 212, and a terminal port number 213 in the overlap management table 29.

In FIG. 45, the NAT control part 22 receives the overlap LAN search response (step S92). The overlap LAN search response illustrated in FIG. 49 includes a message type 221, a result 222 (no overlap, in this case), a terminal ID 223 to which the result is reported, a terminal IP address 224, and a terminal port number 225.

Figures 50, 51:
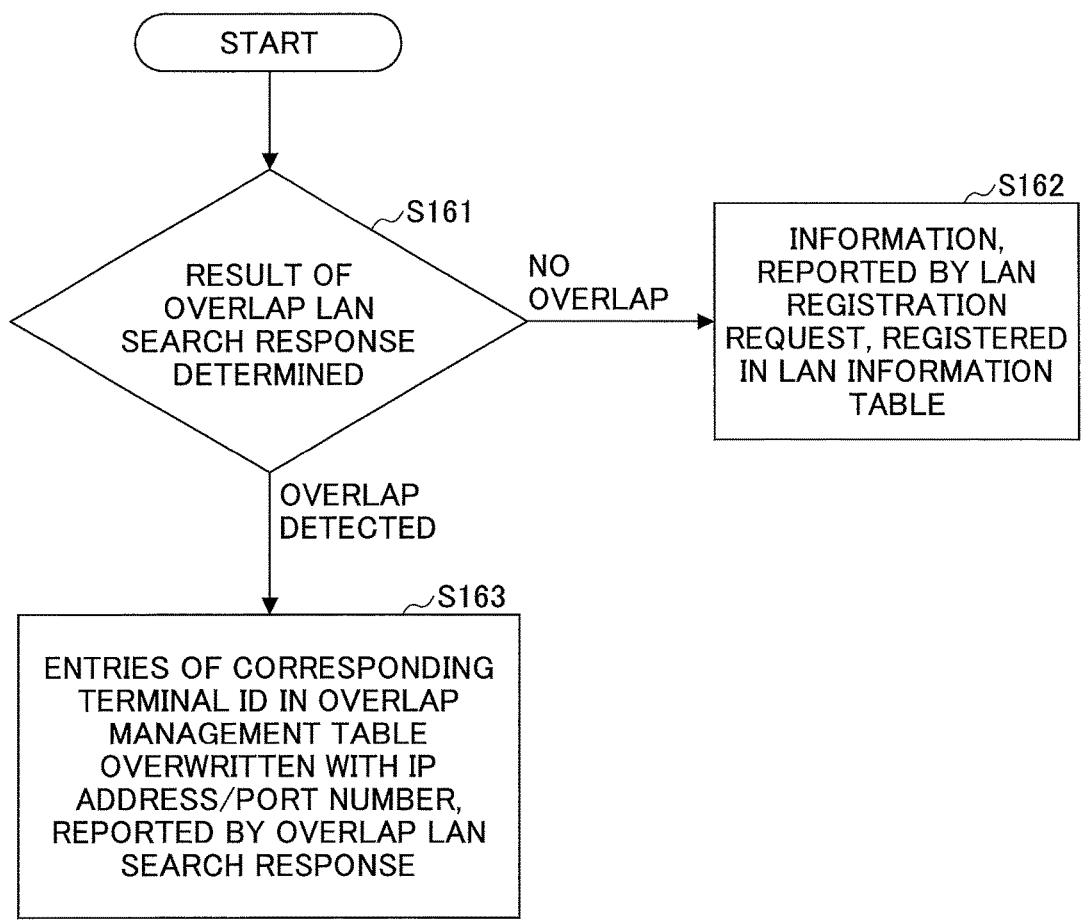
FIG. 50 is a flowchart of a LAN registration process in S93 in FIG. 45.
FIG. 51 is a diagram illustrating an example of a LAN information table stored in the server (NAT control part) in S93 in FIG. 45.

In FIG. 45, then, the NAT control part 22 performs the LAN registration process (step S93). According to the LAN registration process illustrated in FIG. 50, the NAT control part 22 determines the result of the overlap LAN search response (step S161). If the result is "no overlap", the NAT control part 22 registers, in the LAN information table 24, the information reported by the LAN registration request (step S162). Step S163 illustrated in FIG. 50 is described hereinafter. In FIG. 51, an example of the overlap management table 29 stored in the NAT control part 22 is illustrated. With respect to the LAN information of the LAN to which the PC 1 whose terminal ID 231 is "12345" is coupled to, the router 3c whose terminal IP address 232 is "130.130.130.130", the terminal port number 233 "1300", and the periodical transmission interval 234 "800 sec" are registered.

In FIG. 45, after the LAN registration process of step S93, the regular transmission to the LAN1 is started. Then, as illustrated in FIG. 43, it is assumed the PC 1 is coupled to the LAN2. It is noted that the change in the LAN includes the switching between the wired connection and the wireless connection, etc.

Next, the LAN2 registration is described. According to the LAN registration request after the change in the LAN, the UI part 14 of the PC 1 transmits the LAN registration request (step S94). The LAN registration request is transmitted to the LAN change detection part 28 of the server 2 after having been subjected to the address conversion at the router 3*d* (step S95 through step S101).

The LAN change detection part 28 performs the overlap LAN search process (step S102). As illustrated in FIG. 47, the LAN change detection part 28 determines whether the reported terminal ID has been registered in the overlap management table 29 (step S151). In this case, the reported terminal ID "12345" has been registered in a terminal ID 211 in the overlap management table 29 illustrated in FIG. 48. Thus, the LAN change detection part 28 determines that the reported terminal ID has been registered in the overlap management table 29 (step S161 in FIG. 50: overlap detected). As a result of this, the LAN change detection part 28 overwrites the terminal IP address 212 and the terminal port number 213 of the terminal ID 211 "12345" in the overlap management table 29 with the IP address and the port number reported by the overlap LAN search request (step S163 in FIG. 5). Overwritten overlap management table 29 is illustrated in FIG. 52. The entries of the terminal ID 211 "12345" have been overwritten with the terminal IP address "140.140.140.140" and the terminal port number "1400".

In FIG. 45, then, the NAT control part 22 transmits the overlap LAN search response in which the result 222 of the overlap LAN search response illustrated in FIG. 49 is set to "overlap detected" (step S103). In FIG. 45, then, the NAT control part 22 performs the LAN registration process (step S104). According to the LAN registration process, the information in the overlap management table 29 is stored in the LAN information table 24 if it is determined in the overlap LAN search process that the overlap has been detected. In FIG. 53, an example of the overlap management table 24 stored in the NAT control part 22 is illustrated. The entries of the terminal ID "12345" in the LAN information table 24 have been overwritten with the terminal IP address "140.140.140.140" and the port number "1400".

As described above, according to the communication system 10 of the third embodiment, when the LAN to which the PC 1 is coupled has been changed, the server 2 detects the overlapped LAN, which enables the server 2 to distinguish the currently coupled LAN from previously LAN.

It is noted that the communication system 10 according to the first through third embodiments is suited for a case where service is provided in form of push type communication from the server 2 to the PCs in the private network via the Internet.

The communication system 10 according to the first through third embodiments prevents the deletion of the NAT entry even if the router configuration of the router 3 is in multiple stages, and enables the NAT traversal. Further, the communication system 10 is applicable to a NAT-capable broad band router that does not comply with UPnP/STUN (Simple Traversal of UDP through NATs). Further, even when the PC 1 is not in operation, the packet can be transmitted from the server 2 to the PC 1 with the NAT traversal. Further, even if the PC (even in a sleep mode state) is coupled to the Internet via the LAN in which the router configuration is in multiple stages, it becomes possible to keep a state in which the NAT traversal can be performed via the Internet. It is noted that the communication system 10 according to the first through third embodiments is applicable for starting up the PC 1 in the sleep mode with WOL (Wake on LAN) via the Internet when the PC 1 is coupled to the LAN whose router configuration is multiple stages.

Figure 54:
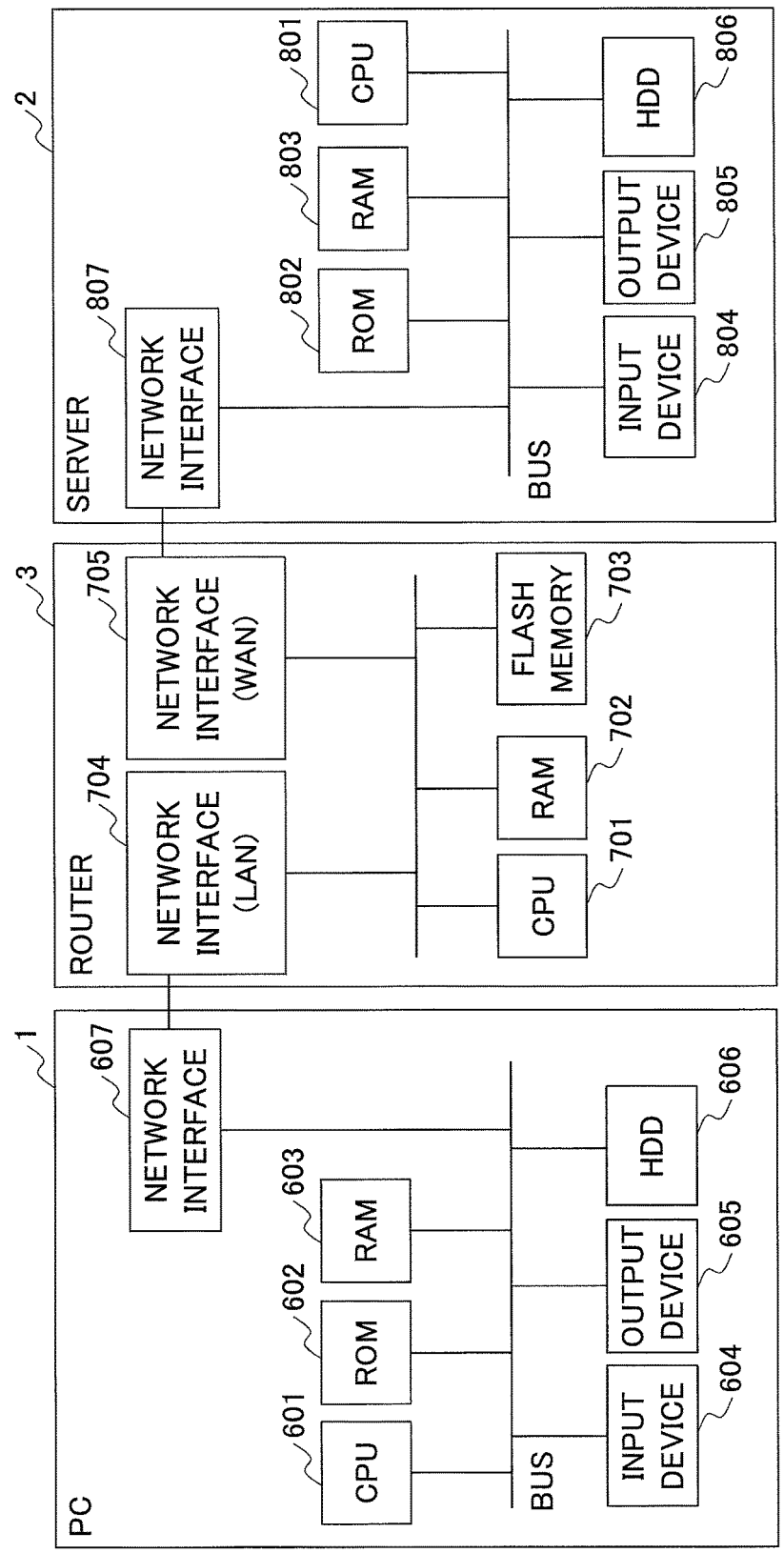
FIG. 54 is a diagram illustrating a hardware resource configuration of a PC, a server, and a router according to the first through third embodiments.

Next, an example of a hardware resource configuration of the PC 1, the router 3, and the server 2 according to the first through third embodiments is explained with reference FIG. 54.

The PC 1 includes a CPU (Central Processing Unit) 601, a ROM (Read Only Memory) 602, a RAM (Random Access Memory) 603, an input device 604, an output device 605, a HDD (Hard Disk Drive) 606, and a network interface 607.

The ROM 602 is a non-volatile semiconductor memory (storage device), and stores therein programs and data such as OS setting, network setting, etc., to be performed at the time of starting up. The RAM 603 is a volatile semiconductor memory (storage) which can temporarily hold the programs and data. The HDD 606 is a nonvolatile storage which stores programs and data. The stored programs and data include an OS (Operating System) which is a basic software item for controlling the apparatus as a whole, and application software items for providing various functions on the OS. For example, the HDD 606 stores the programs to be executed by the CPU 601 for the NAT entry update process, the NAT update cycle optimization process, and the LAN change process. The CPU 601 reads the programs and date from the storage device described above on the RAM to execute the processes, thereby implementing control of the apparatus as a whole and installed functions.

The input device 604 includes a keyboard, a mouse or the like, and is used to input operations to the PC 1. The output device 605 includes a display, etc., to output or display results, etc., for the user of the PC 1.

The network interface 607 is an interface for coupling the PC 1 to the LAN. In this way, the PC 1 is coupled to the router 3 via the network interface 607, and the router 3 performs the address conversion, which enables the PC 1 to communicate with the server 2 on the Internet.

According to such a hardware resource configuration, the UI part 14 can be implemented by the input device 604. The LAN registration part 15, the LAN configuration determination part 16, and the UPnP acquisition part 17 can be implemented by the CPU 601. The communication control part 18 can be implemented by the network interface 607.

The router 3 includes a CPU 701, a RAM 702, a flash memory 703, a network interface 704 (LAN), and a network interface 705 (WAN). The CPU 701 implements control of the router 3 as a whole and installed function, such as the conversion process of the IP address, etc. The RAM 702 is a volatile semiconductor memory (storage) which can temporarily hold the programs and data. The flash memory 703 is an example of an auxiliary storage device.

The network interface 704 (LAN) is an interface for coupling the router 3 to the LAN. The router 3 is coupled to the PC 1 via the network interface 704.

The network interface 705 (WAN) is an interface for coupling the router 3 to the WAN. The router 3 is coupled to the server 2 via the network interface 705.

According to such a hardware resource configuration, the UPnP process part 33 can be implemented by the CPU 601. The NAT table 32 can be stored in the RAM 702 or the flash memory 703. The communication control part 31 can be implemented by the network interfaces 704 and 705.

The server 2 includes a CPU 801, a ROM 802, a RAM 803, an input device 804, an output device 805, a HDD 806, and a network interface 807. The CPU 801 implements control of the server 2 as a whole and installed function, such as the LAN change process, etc. The ROM 802, the RAM 803, the input device 804, the output device 805, and the HDD 806 are the same as those of the PC 1, and thus the explanation thereof is omitted.

The network interface 807 is an interface for coupling the server 2 to the WAN (or the Internet). The server 2 is coupled to the router 3 via the network interface 705.

The transmission interval optimization server 7 has the same hardware resource configuration as the server 2, and thus the explanation thereof is omitted.

According to the configuration, the NAT control part 22 and the cycle optimization part 25 can be implemented by the CPU 801. The LAN information table 24 and the cycle transmission management table 27 can be stored in the RAM 803 or the HDD 806. The communication control parts 21 and 26 can be implemented by the network interface 807.

It is noted that the PC 1, the server 2, and the transmission interval optimization server 7 may include an external I/F (not illustrated) for interfacing with external apparatuses. The external apparatuses include a recording medium, etc. The PC 1, the server 2, and the transmission interval optimization server 7 can read and/or write programs for executing the NAT entry update process, the NAT update cycle optimization process, and the LAN change process from the recording medium via the external I/F. The recording medium may be a CD (Compact Disk), a DVD (Digital Versatile Disk), an SD memory card (SD Memory card), a USB memory (Universal Serial Bus memory), etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

For example, according to the embodiments, the server 2 and the transmission interval optimization server 7 are implemented by separate apparatuses; however, the function of the transmission interval optimization server 7 may be incorporated into the server 2.

What is claimed is:

1. A communication apparatus, comprising:
a processor configured to
determine whether a LAN to which the communication apparatus is connected has a single-stage router configuration where the communication apparatus is connected to an external network via one router or a multiple-stage router configuration where the communication apparatus is connected to the external network via multiple routers, the communication apparatus being connected to a server via the LAN and the external network; and
request the server to transmit a NAT update request packet to one of the routers, which is registered in the server and performs NAT traversal to enable the communication apparatus to communicate with the server, in response to determining that the LAN has the multiple-stage router configuration.

2. The communication apparatus of claim 1, wherein the processor is further configured to transmit a response packet to the server in response to a test packet transmitted from the server with a varied interval; and
a transmission interval at which the NAT update request packet is transmitted from the server to the one of the routers is determined according to a presence or absence of a reception of the response packet by the server within a response period.

3. A server that is coupled to a communication apparatus on a LAN via an external network involving a NAT traversal with a router of the LAN, the server comprising:
a storage configured to store identification information of the communication apparatus and identification information of the LAN obtained when the server is coupled to the communication apparatus on the LAN; and
a processing device, wherein the processing device is configured to
detect, based on the identification information of the communication apparatus and the identification information of the LAN, a change in the LAN to which the communication apparatus is coupled; and
transmit a NAT update request packet to the changed LAN whose change has been detected, in response to a request from the communication apparatus to transmit the NAT update request packet to the router which is registered in the server and performs the NAT traversal.

4. The server of claim 3, wherein the processing device is further configured to
determine a transmission interval of the NAT update request packet based on a presence or absence of a reception of a response packet within a response period, the response packet being transmitted from the communication apparatus in response to a test packet transmitted with a varied interval, and
transmit the NAT update request packet at the determined transmission interval.

5. A communication system, comprising:
a server; and
a communication apparatus connected via a LAN and an external network to the server, wherein
the communication apparatus is configured to:
determine whether the LAN has a single-stage router configuration where the communication apparatus is connected to the external network via one router or a multiple-stage router configuration where the communication apparatus is connected to the external network via multiple routers, and
transmit a request requesting the server to transmit a NAT update request packet to one of the routers, which is registered in the server and performs NAT traversal to enable the communication apparatus to communicate with the server, in response to determining that the LAN has the multiple-stage router configuration; and
the server is configured to transmit the NAT update request packet to the one of the routers in response to the request from the communication apparatus.

6. The communication system of claim 5, wherein
the communication apparatus is further configured to transmit a response packet to the server in response to a test packet transmitted from the server with a varied interval; and
the server is further configured to determine a transmission interval of the NAT update request packet based on a presence or absence of a reception of the response packet within a response period, and transmit the NAT update request packet to the one of the routers at the determined transmission interval.

7. The communication system of claim 5, wherein
the server includes a storage configured to store identification information of the communication apparatus and identification information of the LAN obtained when the server is connected to the communication apparatus; and the server is configured to:
- detect, based on the identification information of the communication apparatus and the identification information of the LAN, a change in the LAN to which the communication apparatus is connected; and
- transmit the NAT update request packet to the one of the routers related to the changed LAN whose change has been detected.

8. A communication method executed by a computer in a communication apparatus, the communication method comprising:
- determining whether a LAN to which the communication apparatus is connected has a single-stage router configuration where the communication apparatus is connected to an external network via one router or a multiple-stage router configuration where the communication apparatus is connected to the external network via multiple routers, the communication apparatus being connected to a server via the LAN and the external network; and
- requesting the server to transmit a NAT update request packet to one of the routers, which is registered in the server and performs NAT traversal to enable the communication apparatus to communicate with the server in response to determining that the LAN has the multiple-stage router configuration.

9. The communication method of claim 8, further comprising:
- transmitting a response packet in response to a test packet transmitted from the server with a varied interval;
- causing the server to determine a transmission interval of the NAT update request packet based on a presence or absence of a reception of the response packet within a response period; and
- causing the server to transmit the NAT update request packet to the one of the routers at the determined transmission interval.

* * * * *